3,531,425
MONOMERIC AND POLYMERIC HYDROXAMATES AND THEIR DERIVATIVES AND PROCESSES FOR MAKING AND USING SAME
Emmett H. Burk, Jr., Glenwood, Larry G. Wolgemuth, Lansing, and Helmuth W. Kutta, Harvey, Ill., assignors to Sinclair Research, Inc., New York, N.Y., a corporation of Delaware
No Drawing. Filed Nov. 7, 1966, Ser. No. 592,288
Int. Cl. C08d 13/08; C08g 22/18
U.S. Cl. 260—22    47 Claims

ABSTRACT OF THE DISCLOSURE

Compounds containing one or more of the reactive groups,

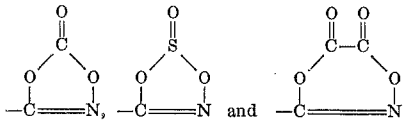

enter into a ring-opening, addition reaction with nucleophilic compounds containing a reactive hydrogen atom, or a positive metal ion or a positive ammonium ion to yield novel hydroxamates. Illustrative of the hydroxamates are those formed when the above reactive groups are attached to R groups and the nucleophile is ethanol:

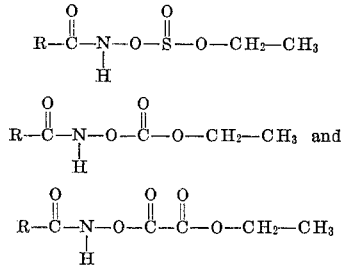

The hydroxamates can, in turn, be decomposed, releasing either $SO_2$, $CO_2$ or a mixture of CO and $CO_2$ and reversing the positions of the carbonyl group and the nitrogen atom, to yield, for example, urethanes, ureas, urea-urethanes, etc. Thus, for example, all of the above hydroxamates decompose to give the urethane product:

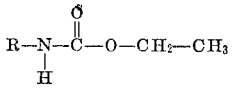

---

This invention relates to the production of certain monomeric and polymeric hydroxamate compounds and other organic compounds such as ureas and urethanes, and to compositions stable under ambient conditions for producing the same. More particularly, the invention is directed to the preparation of certain novel hydroxamates, ureas and urethanes employing as the starting material certain cyclic nitrogen-containing compounds.

Heretofore, it has been common practice to prepare ureas and urethanes by the reaction of an isocyanate and an active hydrogen-containing material. Although use of the isocyanates for the preparation of ureas and urethanes is quite popular and extensively employed, it is not without criticism. First of all, the isocyanates are unstable and present storage and handling difficulties. Secondly, the reactivity of the —NCO group precludes premixing of the isocyanate with the active hydrogen-containing material to form a single component system without first blocking the terminal isocyanate groups. Blocked isocyanate materials have the disadvantage of requiring high curing temperatures to liberate the blocking group and reactivate the —NCO group. Thirdly, in the production of foamed polyurethanes and polyureas via the isocyanate route it is necessary to go through the expense and inconvenience of adding a foaming agent or use an excess of isocyanate and water to gain the required gas release. It is evident, therefore, that any process that produces ureas and urethanes without the aforementioned disadvantages comes as a welcomed contribution to the art.

A process for the preparation of organic compounds, including a novel class of hydroxamates, has now been found, which process avoids the drawbacks associated with isocyanates in the production, for instance, of urethanes and ureas. In accordance with the process of the invention an organic nucleophilic compound is reacted with a compound having the structure:

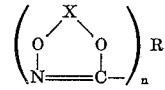

wherein R is a hydrocarbon radical free of nucleophilic groups, X is

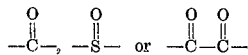

and $n=1$ to 4. For convenience, the latter class of materials will be referred to as cyclic nitrile adducts.

The R radical in the above formula represents a monomeric or polymeric hydrocarbon structure, that is, containing carbon and hydrogen but not excluding the presence of other atoms as part of the main chain or in side chains. Thus, the radical R contains at least 1 carbon atom up to about 5,000 or more so as to give compounds having molecular weights of up to about 75,000 or more.

The monomeric cyclic nitrile adducts can be prepared by reaction of the corresponding hydroxamic acids with thionyl chloride, phosgene or oxalyl chloride. In these monomeric compounds the R radical often has 1 to about 30 or to about 50 carbon atoms or more, preferably up to about 12 carbon atoms, which radicals may be aliphatic, aromatic or mixed aromatic-aliphatic groups, e.g. alkyl, aryl, mono-alkenyl, alkaryl, dialkenyl, arylalkyl, etc. The radicals may be saturated or unsaturated, e.g. contain olefinic bonds which may, if desired, be in the α-position so as to give polymerizable cyclic nitrile adducts.

The polymeric cyclic nitrile adducts can be prepared, for instance, by polymerization of vinyl cyclic nitrile adduct monomers and ethylenically unsaturated monomers as disclosed in copending application Ser. No. 592,285, filed concurrently herewith, now abandoned or by formation of prepolymers by the reaction of monomeric cyclic nitrile adducts and polymeric nucleophilic compounds as discussed below. Illustrative of polymeric R radicals are vinyl hydrocarbons, polyesters, polyethers, including polymeric radicals containing as side chains one or more cyclic nitrile adduct groups, i.e.

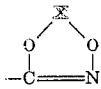

The reaction of hydroxamic acids with thionyl chloride or phosgene has been described in U.S. Pat. No. 3,268,542 and copending applications Ser. Nos. 502,450; 502,347; 502,348; 502,464; 502,327; 502,328; and 502,604 all now abandoned, while the reaction with oxalyl chloride is described in copending application Ser. No. 592,339, filed concurrently herewith.

The hydroxamic acids which can be used to produce the nitrile adduct reactants of the invention include those represented by the structure:

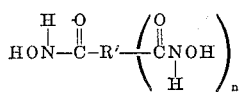

wherein R′ is a monovalent or polyvalent hydrocarbon radical which often has 1 to about 30 or 50 carbon atoms. R′ can be aliphatic, aromatic or mixed aromatic-aliphatic groups. When the poly(nitrile sulfites), poly(nitrile carbonates) or poly(nitrile oxalates) are to be made the $n$ of the hydroxamic acid is 1 to 3, preferably 1 to 2, and when producing the mononitriles $n$ is 0. When R′ contains an aromatic hydrocarbon radical, it often has 1 to 3 aromatic rings and the radical usually contains 6 to about 30 or more carbon atoms, preferably 6 to 12 carbon atoms. Preferably the hydroxamic acid groups are in a non-ortho position on the aromatic ring. The aromatic hydroxamic acid reactants include, for instance, benzohydroxamic acids, naphthohydroxamic acids, anthrohydroxamic acids, phenylbenzohydroxamic acids, phenylnaphthohydroxamic acids, diphenylalkylenehydroxamic acids and dinaphthylalkylenehydroxamic acids.

Illustrative aromatic polyhydroxamic acids suitable for use as reactants in the preparation of the aromatic poly(nitrile sulfites), aromatic poly(nitrile oxalates) and aromatic poly(nitrile carbonates) include the following: benzodihydroxamic acids, such as isophthalodihydroxamic acid and terephthalodihydroxamic acid, benzotrihydroxamic acid, such as 1,3,5-benzenetrihydroxamic acid, benzotetrahydroxamic acid, such as pyromellitohydroxamic acid,
prehnitrotetrahydroxamic acid,
1,4-dimethyl-2,5-benzodihydroxamic acid,
1,3-dimethyl-2,4-benzodihydroxamic acid,
2,3-dimethyl-1,5-benzodihydroxamic acid,
methylbenzodihydroxamic acid,
methylbenzotrihydroxamic acid,
ethylbenzodihydroxamic acid,
ethylbenzotrihydroxamic acid,
hexylbenzodihydroxamic acid,
hexylisophthalodihydroxamic acid,
nonylbenzodihydroxamic acid,
dodecylbenzotrihydroxamic acid,
pentadecylterephthalodihydroxamic acid,
pentadecylterephthalotrihydroxamic acid,
tricosylterephthalodihydroxamic acid,
tricosylterephthalotrihydroxamic acid,
1-benzyl-2,4-benzodihydroxamic acid,
2,8-naphthodihydroxamic acid,
1,3,5-naphthotrihydroxamic acid,
cyclohexylterephthalodihydroxamic acid,
tetrahydronaphthalodihydroxamic acid,
2,2-bis(p-phenylhydroxamic acid)propane,
bis(p-phenylhydroxamic acid)methane,
1-chloroisophthalodihydroxamic acid,
4-bromo-1,3,5-tribenzohydroxamic acid,
3-nitroterephthalodihydroxamic acid,
2,8-anthracenetrihydroxamic acid,
4,4¹-diphenylethanedihydroxamic acid,
biphenyldihydroxamic acid,
2,2¹-diphenylethanedihydroxamic acid,
4,4¹-stilbenedihydroxamic acid,
2,2¹-stilbenedihydroxamic acid.

Illustrative examples of aromatic poly(nitrile sulfites) and aromatic poly(nitrile carbonates) include those corresponding to the foregoing hydroxamic acids such as benzodi(nitrile sulfites), isophthalodi(nitrile carbonate) and terephthalodi(nitrile sulfite), etc.

Aromatic monohydroxamic acids suitable for use as reactants in the preparation of the aromatic mono(nitrile carbonates), aromatic mono(nitrile oxalates) and aromatic mono(nitrile sulfites) include the following: benzohydroxamic acid, the monohydroxamic acids of alkylated benzenes such as tolylhydroxamic acid,
xylylhydroxamic acid,
trimethylbenzohydroxamic acid,
ethylbenzohydroxamic acid,
hexylbenzohydroxamic acid,
nonylbenzohydroxamic acid,
dodecylbenzohydroxamic acid,
pentadecylbenzohydroxamic acid,
tricosylbenzohydroxamic acid,
naphthomonohydroxamic acids,
such as 1-naphthohydroxamic acid,
cyclohexylbenzohydroxamic acid,
tetrahydronaphthohydroxamic acid,
1-chloro-4-benzohydroxamic acid,
4-bromo-1-benzohydroxamic acid,
3-nitrobenzohydroxamic acid,
anthracenemonohydroxamic acids,
biphenylmonohydroxamic acids,
such as 4-phenylbenzohydroxamic acid,
1-benzyl-4-benzohydroxamic acid,
1-phenylethyl-4-benzohydroxamic acid, and the like. Illustrative examples of aromatic mono(nitrile sulfites), mono(nitrile carbonates) and mono(nitrile oxalates) include those corresponding to the foregoing hydroxamic acids such as benzo(nitrile carbonate), the mononitrile adducts of alkylated benzenes, such as tolyl(nitrile sulfite), xylyl(nitrile carbonate), tolyl(nitrile oxalate), etc.

Illustrative aliphatic polyhydroxamic acids suitable for use as reactants in the preparation of the aliphatic poly(nitrile sulfites), aliphatic mono(nitrile oxalates) and aliphatic poly(nitrile carbonates) include the following:

malonodihydroxamic acid,
succinodihydroxamic acid,
glutarodihydroxamic acid,
adipodihydroxamic acid,
pimelodihydroxamic acid,
suberodihydroxamic acid,
azelodihydroxamic acid,
sebacodihydroxamic acid,
fumarodihydroxamic acid,
itacodihydroxamic acid,
allylmalonodihydroxamic acid,
allylsuccinodihydroxamic acid,
cetylmalonodihydroxamic acid,
1,6,9-decanetrihydroxamic acid,
1,3,6-heptanetrihydroxamic acid,
cyclohexyldihydroxamic acid,
4-bromo-1,6-decanedihydroxamic acid,
2-chloro-1,9-nonanedihydroxamic acid, etc. Illustrtive examples of aliphatic polynitrile adducts include those corresponding to the foregoing hydroxamic acids such as malonodi(nitrile sulfite), succinodi(nitrile carbonate), glutarodi(nitrile carbonate), adipodi(nitrile sulfite), etc.

Illutrative aliphatic monohydroxamic acids suitable for use as reactants in the preparation of the aliphatic mono (nitrile carbonates), aliphatic mono(nitrile oxalates) and aliphatic mono(nitrile sulfites) include the following:

methylhydroxamic acid,
ethylhydroxamic acid,
propylhydroxamic acid,
isopropylhydroxamic acid,
butylhydroxamic acid,
isobutylhydroxamic acid,
pentylhydroxamic acid,
1-methyl-2-propylhexylhydroxamic acid,
cyclohexylhydroxamic acid,
3,5-dimethylhexylhydroxamic acid,
2-methylbutylhydroxamic acid,
n-nonylhydroxamic acid,
decalinhydroxamic acid,
n-dodecylhydroxamic acid,
2-propyldodecylhydroxamic acid,
n-heptadecylhydroxamic acid,
n-pentadecylhydroxamic acid,
stearylhydroxamic acid,
heptadecylhydroxamic acid,
tricosylhydroxamic acid,
butenyl-3-hydroxamic acid,
octenyl-7-hydroxamic acid,
2-ethyloctenyl-7-hydroxamic acid,
3,5-dimethyldecenylhydroxamic acid,
n-dodecenyl-11-hydroxamic acid,
oleylhydroxamic acid,
cetenehydroxamic acid,
eicosenehydroxamic acid,
4-chlorobutylhydroxamic acid,
3,5-dibromohexylhydroxamic acid and
8-nitrooctylhydroxamic acid.

Illustrative examples of aliphatic mononitrile adducts include those corresponding to the foregoing hydroxamic acids such as acetonitrile carbonate, propionitrile sulfite, isobutyronitrile carbonate, etc.

The temperature for effecting the reaction of the hydroxamic acid and thionyl chloride, phosgene or oxalyl chloride may vary depending upon the particular hydroxamic acid selected but in all cases should be conducted below the decomposition temperature of the desired nitrile adduct. Reflux temperatures can also be used as long as the reflux temperature of the particular mixture is below the decomposition temperature of the corresponding nitrile produced. The reaction temperature will often fall in the range of up to about 90° C., preferably up to about 50° C. The reaction has been successfully run at temperatures as low as about minus 30° C. Ordinarily the reaction will proceed readily at atmospheric pressure but sub- and superatmospheric pressure can be employed if desired.

Either the hydroxamic acid reactant or the thionyl chloride, phosgene or oxalyl chloride reactant can be in excess but it is preferred that at least a stoichiometric amount of the latter be used, that is, a ratio of at least one mole of thionyl, carbonyl or oxalyl chloride per hydroxamic acid substituent. A large excess of the chloride reactant is particularly preferred. The reaction can be conducted in the liquid phase and in many cases the hydroxamic acid will react from the solid state. Advantageously, the hydroxamic acid is first dissolved or slurried in a suitable organic solvent. Illustrative of suitable solvents are the thionyl chloride reactant itself and normally liquid organic ethers, esters, acetonitrile, and the like. The preferred solvent is the thionyl, carbonyl or oxalyl chloride reactant, an excess of which will partially dissolve the hydroxamic acid. Advantageously, the thionyl, carbonyl or oxalyl chloride constitutes the sole solvent in the reaction medium.

The reaction is often over in less than about 0.5 hour, for example, 15 minutes, or in about 5 to 20 hours, depending upon the particular hydroxamic acid and reaction temperature employed and is marked by a cessation in hydrogen chloride gas evolution. Normally at least about 0.5 hour is required for the reaction to go to completion at temperatures which minimize side reactions. The reaction is usually quite rapid as the hydroxamic acid reactant is dissolved. At the lower reaction temperatures the hydroxamic acid reactant is generally slow to dissolve and may even come out of solution, go back into solution, etc., during the reaction.

The nitrile adduct can be recovered from the resulting solution by any desirable means, for example, by first filtering the solution to remove any unreacted starting materials and subjecting the filtrate to reduced pressure to remove unreacted chloride reactant and inert solvent, if employed, and provide the nitrile adduct as a crude product. Alternatively, prior to the filtering step, the solution can be cooled to crystallize out the product which can be recovered as desired. The crude product can be either crystalline or liquid depending on the particular nitrile adduct prepared. A purer product can be obtained by recrystallization techniques as, for instance, from a suitable solvent such as dichloromethane, carbon disulfide, ethyl acetate, thionyl chloride and the like, or mixtures thereof.

The following Examples I through XXI illustrate preparation of the cyclic nitrile adduct reactants of the invention.

EXAMPLE I

To a 300 cc. fluted, round bottom flask equipped with a reflux condenser attached to a $CaCl_2$ drying tube, were added 9.8 g. (0.050 mole) of isophthalodihydroxamic acid and 165 g. (1.35 moles) of thionyl chloride. The reaction mixture was stirred mechanically and heated to a maximum temperature of 45° C. for one hour. The resulting solution was filtered and the thionyl chloride removed under reduced pressure. There was obtained 14.4 g. of an isophthalodi(nitrile sulfite) product containing small amounts of impurities and having a melting point of 104–107° C. Recrystallization from carbon disulfide gave white crystals having a melting point of 118–119° C.

*Analysis.*—Calc'd for $C_8H_4N_2O_6S_2$ (percent): C, 33.33; H, 1.40; N, 9.72; S, 22.25. Found (percent): C, 34.03; H, 1.54; N, 9.32; S, 22.00.

The infrared spectrum (Nujol mull) of the recrystallized material was determined and showed a significant absorption peak at 6.22 microns, characteristic of conjugated C—N stretching vibrations, and a significant band in the 8.17 micron region characteristic of cyclic sulfites.

EXAMPLE II

To a 300 cc. fluted, round bottom flask equipped with a reflux condenser attached to a $CaCl_2$ drying tube, were added 9.8 g. (0.050 mole) of a terephthalodihydroxamic acid and 121 g. (1.01 moles) of thionyl chloride. The reaction mixture was stirred mechanically and heated to a maximum temperature of 45° C. for two hours. The resulting solution was filtered and the thionyl chloride removed under reduced pressure. There resulted 14.2 g. (99%) of terephthalodi(nitrile sulfite) containing small amounts of impurities and having a melting point of 139° C. (dec.). Recrystallization from dichloromethane gave white crystals, M.P. 143° C. (dec.).

*Analysis.*—Calc'd for $C_8H_4N_2O_6S_2$ (percent): C, 33.33; H, 1.40; N, 9.72; S, 22.25. Found (percent): C, 33.72; H, 1.54; N, 9.10; S, 22.30.

The infrared spectrum (Nujol mull) of the recrystallized material showed a significant band at 6.22 microns characteristic of a conjugated C—N stretching vibration, and significant absorption in the 8.06 micron region characteristic of cyclic sulfites.

EXAMPLE III

Fifty grams of an 85:15 mixture of isophthalodihydroxamic acid and terephthalodihydroxamic acid was added to 298 g. of thionyl chloride at room temperature with mechanical stirring. The mixture was warmed to 45° C. where the solid dissolved almost completely and vigorous gas evolution was noted. After one hour at 45° C. and removal by filtration of a small amount of insoluble matter, the filtrate was chilled at −10° C. for several hours. Filtration of the cold mixture afforded 40 g. (52%) of a mixture of iso- and terephthalodi(nitrile sulfites), M.P. (dec.) 105–107° C. A second crop of less pure disulfites was obtained by complete evaporation of the thionyl chloride: 30.5 g., M.P. (dec.) 95–98° C. Total yield, 91.5%.

EXAMPLE IV

To a 300 cc. fluted, round bottom flask equipped with a reflux condenser attached to a $CaCl_2$ drying tube, were added 4.2 g. (0.029 mole) of fumarodihydroxamic acid and 248 g. (2.08 moles) of thionyl chloride. The reaction mixture was stirred mechanically and heated to reflux for half an hour. The resulting solution was filtered and the thionyl chloride removed under reduced pressure. There resulted a near quantitative yield of crude fumarodi(nitrile sulfite), M.P. 149–150° C. (dec.). Recrystallization from benzene gave chlorine-free white needles, M.P. 150° C. (dec.).

EXAMPLE V

To a 500 cc. fluted, round bottom flask equipped with a reflux condenser attached to a $CaCl_2$ drying tube, were added 23.8 g. (0.14 mole) of adipodihydroxamic acid and 495 g. (4.16 moles) of thionyl chloride. The reaction mixture was stirred mechanically and heated to a maximum temperature of 55° C. for two hours. The resulting solution was filtered and the thionyl chloride removed under reduced pressure. There resulted a near quantitative yield of crude adipodi(nitrile sulfite) which upon recrystallization from pentane gave chlorine-free white crystals, M.P. 45° C.

The infrared spectrum (Nujol mull) of the recrystallized material showed a significant band at 6.19 microns, characteristic of a C=N stretching vibration and significant absorption in the 8.13 micron region characteristic of cyclic nitrile sulfites.

EXAMPLE VI

To a 500 cc. fluted, round bottom flask equipped with a reflux condenser attached to a $CaCl_2$ drying tube, were added 28.0 g. (0.121 mole) of sebacodihydroxamic acid and 495 g. (4.16 moles) of thionyl chloride. The reaction mixture was stirred mechanically and maintained at a maximum temperature of 25° C. for two hours. The reaction mixture was filtered to give 5.9 g. of starting material. The thionyl chloride was removed under reduced pressure from the filtrate to give a near quantitative yield of cyclic nitrile sulfite based on reacted starting material. The sebacodi(nitrile sulfite), M.P. 47–49° C., was recrystallized from pentane to give chlorine-free white crystals, M.P. 48–50° C.

Analysis.—Calc'd for $C_{10}H_{16}N_2O_6S_2$ (percent): C, 37.05; H, 4.94; N, 8.65; S, 19.75. Found (percent): C, 37.89; H, 5.50; N, 7.29.

The infrared spectrum (Nujol mull) of the recrystallized material showed a significant band at 6.19 microns, characteristic of a C=N stretching vibration and significant absorption in the 8.15 micron region characteristic of cyclic nitrile sulfites.

EXAMPLE VII

To a 300 cc. fluted, round bottom flask equipped with a reflux condenser attached to a $CaCl_2$ drying tube, are added 9.8 g. (0.095 mole) of propylhydroxamic acid and 165 g. (1.35 moles) of thionyl chloride. The reaction mixture is stirred mechanically and heated to reflux for half an hour. The resulting solution is filtered and the thionyl chloride removed under reduced pressure to obtain a butyronitrile sulfite product containing small amounts of impurities. Recrystallization from benzene gives chlorine-free butyronitrile sulfite.

EXAMPLE VIII

To a 300 cc. fluted, round bottom flask equipped with a reflux condenser attached to a $CaCl_2$ drying tube, is added 9.8 g. (0.052 mole) of nonylhydroxamic acid and 121 g. (1.01 moles) of thionyl chloride. The reaction mixture is stirred mechanically and heated to reflux for two hours. The resulting solution is filtered and the thionyl chloride removed under reduced pressure to obtain a decanonitrile sulfite product containing small amounts of impurities. Recrystallization from dichloromethane gives chlorine-free decanonitrile sulfite.

EXAMPLE IX

To a 300 cc. fluted, round bottom flask equipped with a reflux condenser attached to a $CaCl_2$ drying tube, were added 50 g. (0.30 mole) of p-methoxybenzohydroxamic acid and 372 g. (3.15 moles) of thionyl chloride. The reaction mixture was stirred rapidly and heated at 27° C. for one hour. The resulting solution was filtered and there resulted a near quantitative yield of crude, oily p-methoxybenzonitrile sulfite which upon trituration with an ether-pentane mixture gave a chlorine-free solid, M.P. 40–44° C. The infrared spectrum (Nujol mull) of the solid material showed the typical cyclic nitrile sulfite absorptions.

EXAMPLE X

In a similar manner, to Example IX, 50.0 g. (0.274 mole) of p-nitrobenzohydroxamic acid was treated with 330 g. (2.77 moles) of thionyl chloride for four hours at a maximum temperature of 35° C. There was obtained a near quantatative yield of p-nitrobenzonitrile sulfite which upon trituration with pentane gave a chlorine-free white solid, M.P. 126–127° C. (dec.). The infrared spectrum (Nujol mull) of the material showed the significant C=N stretching vibration in the 6.25 micron region and a band at 8.0 microns characteristic of cyclic nitrile sulfites.

EXAMPLE XI

In like fashion, to Example IX, 49.7 g. (0.273 mole) of m-nitro-benzohydroxamic acid were treated with 330 g. (2.77 moles) of thionyl chloride for an hour and a quarter at a maximum temperature of 44° C. There was obtained a near quantitative yield of m-nitrobenzonitrile sulfite which upon trituration with pentane gave a solid M.P. 68–71° C. The infrared spectrum (Nujol mull) of the material showed the characteristic cyclic nitrile sulfite stretching vibrations.

EXAMPLE XII

To a 100 cc. round bottom flask equipped with a reflux condenser attached to a $CaCl_2$ drying tube, are added 50 g. (0.30 mole) of p-methoxybenzohydroxamic acid and 372 g. (3.75 moles) of phosgene. The mixture is stirred mechanically at 27° C. for about one hour. The resulting solution is filtered and there results a near quantitative yield of crude oily p-methoxybenzonitrile carbonate, which upon trituration with an ether-pentane solvent gives a chlorine-free white solid. The infrared spectrum (Nujol mull) of the recrystallized material showed the typical cyclic nitrile carbonate absorptions.

EXAMPLE XIII

In a similar manner, to Example XII, 50.0 g. (0.274 mole) of p-nitrobenzohydroxamic acid is treated with 330 g. (3.33 moles) of phosgene for four hours at a maximum temperature of 35° C. There is obtained a near quantitative yield of crude p-nitrobenzonitrile carbonate which upon trituration with pentane gives a chlorine-free white solid. The infrared spectrum (Nujol mull) of the material shows the significant C=N stretching vibration in the 6.25 micron region and a band at 5.5 microns characteristic of cyclic nitrile carbonates.

EXAMPLE XIV

In like fashion, to Example XII, 49.7 g. (0.273 mole) of m-nitrobenzohydroxamic acid is treated with 330 g.

(3.33 moles) of phosgene for an hour and a quarter at a maximum temperature of 44° C. There is obtained a near quantitative yield of crude m-nitrobenzonitrile carbonate which upon trituration with pentane gives a solid. The infrared spectrum (Nujol mull) of the material showed the characteristic cyclic nitrile carbonate stretching vibrations.

EXAMPLE XV

A 500 ml. Erlenmeyer flask equipped with magnetic stirrer and Dry Ice condenser containing 100 ml. of diethylether was charged with 14 g. (0.14 mole) of phosgene. This mixture was magnetically stirred and 3 g. (0.033 mole) of ethylhydroxamic acid was added in three portions. A reaction temperature of 30–40° C. was maintained for two hours. The resulting solution was filtered to remove unreacted material. After removing the excess phosgene and solvent under reduced pressure, 3.5 g. (90% yield) of crude, liquid, propionitrile carbonate was obtained. Distillation of this product at 45° C. (1 mm. Hg) gave 3.1 g. (80% yield) of colorless propiomononitrile carbonate with a refractive index of $n_D^{25}$ 1.4190. The I.R. absorption bands at 5.35 and 5.65µ are indicative of this type of compound.

EXAMPLE XVI

To a 300 cc. fluted, round bottom flask equipped with a reflux condenser attached to a $CaCl_2$ drying tube, is added 9.8 g. (0.052 mole) of a nonylhydroxamic acid and 121 g. (1.22 moles) of phosgene. The reaction mixture is stirred mechanically and heated to reflux for two hours. The resulting solution is filtered and the phosgene removed under reduced pressure to obtain a decanonitrile carbonate product containing small amounts of impurities. Recrystallization from dichloromethane gives chlorine-free decanonitrile carbonate.

EXAMPLE XVII

To a 100 cc. round bottom, 1-necked flask equipped with a Dry Ice reflux condenser attached to a $CaCl_2$ drying tube and a magnetic stirrer were added 50 ml. of phosgene and 1.0036 g. of terephthalodihydroxamic acid. The reaction was stirred for about two hours then the phosgene allowed to evaporate off. The crude residue (1.0883 g.) was extracted with hot benzene. The benzene solution on cooling yielded white crystals of terephthalodi-(nitrile carbonate), decomp. point 187–190° C. Yield 8.7%.

The infrared spectrum (Nujol mull) of the recrystallized material showed a significant band at 6.19 microns, characteristic of a conjugated C≡N stretching vibration and strong bands at 5.37 and 5.45 microns characteristic of cyclic nitrile carbonates.

EXAMPLE XVIII

Using a reaction setup identical to the one described in the above reaction, 2.00 g. of adipodihydroxamic acid was added to 50 ml. of phosgene. The reaction conditions and workup were identical to the above reaction. The crude residue (2.34 g.) was recrystallized from a chloroform-pentane mixture (ratio of 2.5 to 1.0 respectively) to yield white crystals of adipodi(nitrile carbonate), M.P. 55–56° C. Yield 19.3%.

The infrared spectrum (Nujol mull) of the recrystallized material showed a significant band at 6.03 microns characteristic of C≡N stretching vibration; a medium band at 5.34 and a strong band at 5.44 microns characteristic of cyclic nitrile carbonates.

EXAMPLE XIX

A mixture of 1.9 g. (.014 mole) of benzohydroxamic acid in 100 cc. ether and 10 cc. (large excess) of oxalyl chloride was refluxed for half an hour. The solution was filtered and the solvent removed under reduced pressure. There resulted 2.0 g. (74%) of benzonitrile oxalate, M.P. 123–126° C. dec. Recrystallization from an ether-pentane mixture gave white crystals, M.P. 126–127° C. dec. The infrared spectrum of the material (Nujol mull) showed the typical cyclic nitrile oxalate peaks.

EXAMPLE XX

To 20 cc. (large excess) of oxalyl chloride was added in portions 1.0 g. (0.0061 mole) of p-vinylbenzohydroxamic acid, and the reaction mixture refluxed for five minutes. The resulting solution was filtered and set aside until the product crystallized from solution. There was obtained 0.80 g. (62%) of p-vinylbenzonitrile oxalate, M.P. 145–147° C. dec.

*Analysis.*—Calc'd for $C_{11}H_7NO_4$ (percent): C, 60.83; H, 3.25; N, 6.45; O, 29.47. Found (percent): C, 60.58; H, 3.42; N, 6.70.

The infrared spectrum of the product (Nujol mull) shows typical cyclic nitrile oxalate absorptions.

EXAMPLE XXI

A 250 ml. Erlenmeyer flask, equipped with stirrer, nitrogen inlet and a condenser, was charged with 9.8 g. (0.05 mole) of terephthalodihydroxamic acid dispersed in 63.46 g. (0.5 mole) of oxalyl chloride and stirred for 24 hours at room temperature. A provision was made to collect the evolved hydrochloric acid in a standardized (1.0 normal) sodium hydroxide solution to determine the progress of the reaction. After the stoichiometric amount of hydrochloride acid was collected the reaction was terminated, filtered and crude material recrystallized from a mixture of tetrahydrofuran and oxalyl chloride.

The terephthalodi(nitrile oxalate) was characterized by I.R. analysis. The infrared spectrum of the produce (Nujol mull) showed peaks at 5.45µ and 5.61µ which are characteristic for this type of cyclic nitrile oxalate absorption.

The decomposition point of terephthalodi(nitrile oxalate) was observed at 148° C.

The isophthalodi(nitrile oxalate) was prepared in the same manner and showed a decomposition point at 151° C.

The nucleophilic organic compounds reacted with the cyclic nitrile adducts of the invention include oragnic compounds having at least one free or active hydrogen atom or nucleophilic compounds associated with at least one positive metal or ammonium ion.

Nucleophilic compounds having an active hydrogen include, for instance, compounds having the active hydrogen present in —OH, —NH—, —NH₂, —SH, —SO₂NH₂, —SO₂OH, —COOH, —CSNH₂ and

—CONHR groups. Nucleophiles having an active hydrogen atom may be further identified as those that give a positive Zerewitinoff test, that is, any compound which, when added to a Grignard solution of methyl iodide, liberates methane by decomposition of the Grignard reagent. The positive metal associated with nucleophile in the second group nucleophiles which can be reacted with the cyclic nitrile adduct, may be any positive metal having a valence of 1 or more.

In the case of the relatively weak nucleophiles as, for instance, —COOH, —SO₂OH, —CSNH₂ and —CONHR group-containing compounds, the reaction of the invention can be enhanced or catalyzed by use of a relatively stronger nucleophile associated with a positive metal or ammonium ion or relatively stronger nucleophiles which neither give a positive Zerewitinoff test nor are associated with a positive metal or ammonium ion. An example of the latter group of nucleophiles are the tertiary amines.

The nucleophilic compounds of the invention reacted with the cyclic nitrile adducts may be simple compounds of relatively low molecular weight or high molecular weight compounds such as polymeric materials, for instance, having molecular weights of at least about 200 up to about 75,000 or more. The nucleophiles can be monofunctional, that is, containing one reactive hydrogen or positive metal or ammonium ion, or polyfunctional, including difunctional, that is, including more than one reactive hydrogen or positive ion. The preferred nucleophilic compounds contain a reactive hydrogen or positive ion at terminal ends of the longest chain of the molecule.

In accordance with the invention, one or more of the nucleophilic compounds may be reacted with the cyclic nitrile adduct to provide certain hydroxamate compounds or through or from these hydroxamate compounds a variety of organic products such as urethane, urea or urea-urethane groups or linkage-containing organic products. The novel hydroxamate compounds or products therefrom may be monomeric or polymeric depending upon the cyclic nitrile adduct and nucleophile selected, the proportions of reactants employed and the reaction conditions utilized. The following illustrates some of the types of hydroxamates and products, and the reactions contemplated by the invention. For the sake of convenience, the hydroxamates of the invention will hereinafter be referred to as Type I products and the products therefrom Type II products. In the reactions ⓝ—represents the cyclic nitrile adduct group:

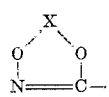

R is a hydrocarbon radical as defined above in the structure of the cyclic nitrile adduct reactant; X is

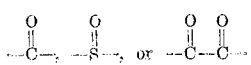

and Z—A and Z—A—Z are monofunctional and difunctional nucleophilic compounds, respectively, wherein Z is either H or a positive metal or ammonium ion. In the reaction to the Type II products, $CO_2$ or $SO_2$ represented below as —OX— is evolved. It is noted that in the case of the cyclic nitrile oxalate CO is evolved as well.

(A) Reaction of cyclic mononitrile adduct+monofunctional Z-containing reactant:

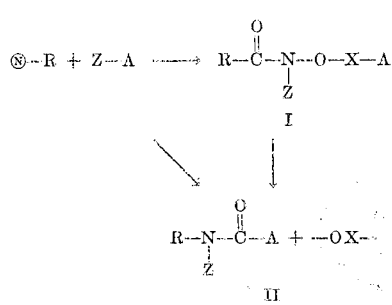

(B) Reactions of cyclic mononitrile adduct+difunctional Z-containing reactant:

(1)

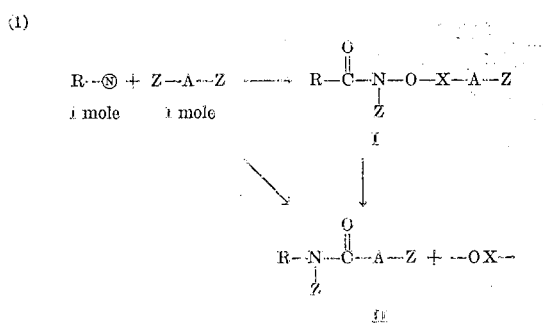

(2)

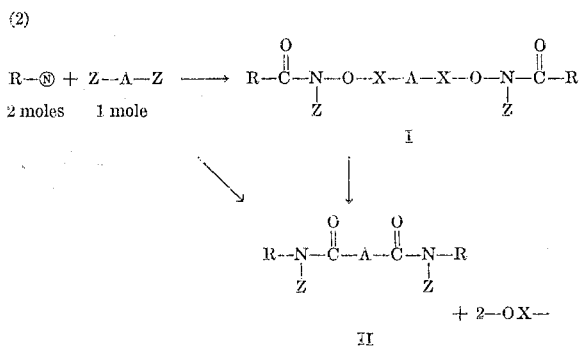

(C) Reactions of cyclic dinitrile adduct+monofunctional Z-containing reactant:

(1)

(2)

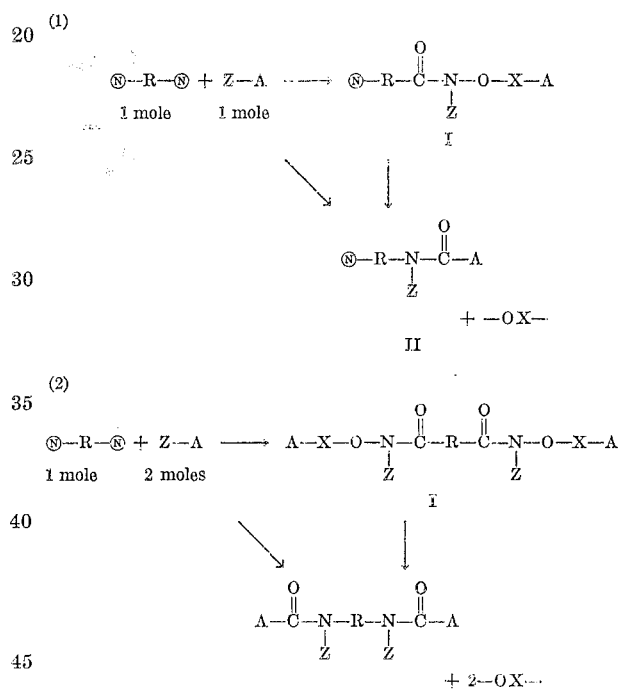

(D) Reactions of cyclic dinitrile adduct+difunctional Z-containing reactant:

(1)
ⓝ—R—ⓝ + ≧ 2 moles Z—A—Z ⟶ I (2)
ⓝ—R—ⓝ + Z—A—Z ⟶ I
≧ 2 moles

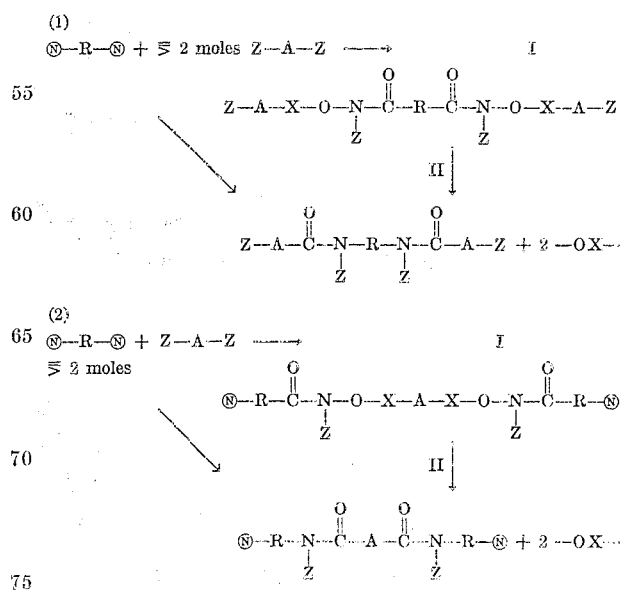

(E) Reaction of cyclic dinitrile adduct+difunctional Z-containing reactant:

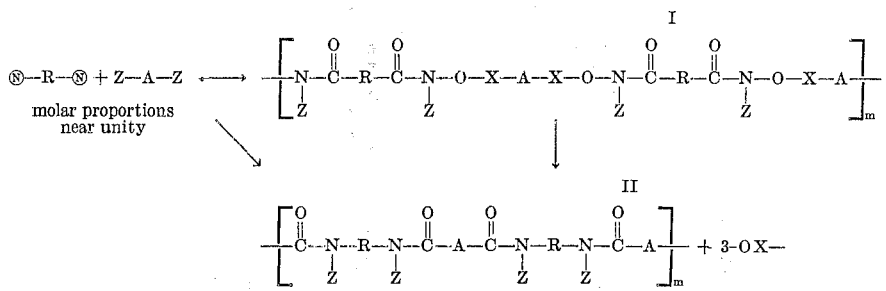

It should be understood that reactions similar to those generally illustrated with the cyclic dinitrile adduct can also be carried out with a reactant containing more than two cyclic nitrile adduct groups. Likewise, Z-containing reactants having a plurality of active hydrogens or positive ions, examples of which are given below may also be used, for instance, to prepare crosslinked polymers. The structure of —A— in the reactions illustrated above is determined by the particular nucleophile reactant utilized and is the residue of the nucleophile remaining after loss of Z. In the reactions more than one type of nucleophile can be used either as a mixture or in a subsequent reaction.

As can be seen from the reactions illustrated above the reaction of the cyclic nitrile adduct and nucleophile may produce either the novel hydroxamate (Type I) or other products (Type II). Illustrative of the Type II products for instance, are urethanes, ureas, or urea-urethanes depending upon whether the nucleophile employed contains an —OH group, —NH$_2$ group or a mixture of the two. Of particular value are the cyclic nitrile adduct group-terminated Types I and II products which are stable, non-toxic and can be stored for reaction at a later date with more nucleophile compound to the corresponding hydroxamate or Type II product. In the case of the cyclic nitrile adduct group-terminated hydroxamates reaction with more nucleophile may produce either an hydroxamate or Type II product depending upon the reaction conditions.

Also as illustrated, the Type II products may be obtained either directly, that is, in a single step from the starting reactants or by decomposition of the novel hydroxamate. Whether the reaction goes to the novel hydroxamate product or the final Type II product depends upon the reaction conditions and catalyst employed.

In general, the cyclic nitrile adduct and nucleophile may be reacted in the presence or absence of catalyst at temperatures below the degradation temperature of the desired product, be it the novel hydroxamates (Type I) or the other Type II products. Although both the hydroxamate compounds and Type II products have been prepared in the absence of catalysts, the use of catalysts is recommended. Use of a weak base catalyst, such as tertiary amines, having a pKa of up to 8 and relatively low reaction temperatures gives a selective reaction to the novel hydroxamate compounds of the invention. On the other hand, strong base catalysts, such as, tertiary amine catalysts, having a pKa value greater than 8, elevated reaction temperatures and sufficient reaction times take the reaction all the way to the Type II products. Illustrative of tertiary amine catalysts suitable for use in the preparation of the novel hydroxamate compounds are pyridine, 2-methylpyridine, 3-methylpyridine, 2,6-dimethylpyridine, 2-dimethylaniline, diethylaniline, p-methyl-diethylaniline, N-methylmorpholine, N-ethylmorpholine, N-allylmorpholine, and the like. Examples of strong base catalysts suitable for use in the preparation of the Type II products are triethylamine, trimethylamine, tri-n-propylamine, tri-n-butylamine, N-ethylpiperidine, N-allylpiperidine, etc.

Reaction temperatures ordinarily employed for preparation of the hydroxamate compounds of the invention usually fall in the range of about —20 to 150° C., preferably 25 to 100° C., the actual temperature selected being dependent upon the particular reactants and hether or not a catalyst is employed. Preparation of the Type II products, such as urethanes and ureas, directly from the cyclic nitrile adduct and nucleophile is generally effected using reaction temperatures of about 30 to 170° C., preferably 50 to 120° C., again the actual temperature employed being dependent upon the reactants and whether or not a catalyst is used.

Type II products employing the novel hydroxamate compounds of the invention as the starting materials are obtained by decomposing the hydroxamates, usually at a temperature of about 50 to 150° C. The decomposition results in the corresponding isocyanate and nucleophilic reactant which then react together to provide the Type II products. Thus, if desired, the isocyanates resulting from the decomposition of the hydroxamate may be recovered, providing the nucleophilic compound also resulting from the decomposition is quickly removed from the reaction mixture to preclude reaction with the isocyanate. This may be accomplished, for instance, by using a decomposition temperature at which the nucleophilic compound rapidly volatilizes off.

The reactions to the hydroxamate Type I or the Type II products of the invention proceed under atmospheric pressure, although sub- and superatmospheric pressures can be used, if desired.

The proportions of reactants are dependent essentially upon the types of products desired. When a monomeric product is desired the cyclic nitrile adduct reactant and nucleophile may be in stoichiometric proportions or an excess of either can be used. When a polymeric product is desired, the ratio of nitrile adduct groups to nucleophile groups usually falls in the range of about .7 to 10:1. In the preparation of elastomers the ratio of nitrile adduct groups to nucleophilic groups is ordinarily kept near unity, for example, about .7 to 1.4:1, preferably about 0.8 to 1.2:1. In the preparation of prepolymers, on the other hand, an excess of the nitrile adduct compound is used, for instances about 1.5 to 10 equivalents, preferably about 2 to 4 equivalents of nitrile adduct groups per equivalent of nucleophilic group. Should mixtures of different nucleophilic compounds be employed in the reaction they can be present in any desired mole ratio. Advantageously, urea-urethane elastomeric products are obtained, however, by employing —OH to —NH$_2$ mole ratios of about .01 to 100:1, preferably about 1 to 10:1. The reactions can be performed under bulk reaction conditions but may also take place with the reactants dispersed in a non-reactive medium. Advantageously, this medium will be one which dissolves both reactants to at least some extent. The preparation of the hydroxamate compound, urethane or isocyanate products employing, by way of example, isophthalodi(nitrile carbonate) as the cyclic nitrile reactant and methyl alcohol as the nucleophilic compound may be illustrated as follows:

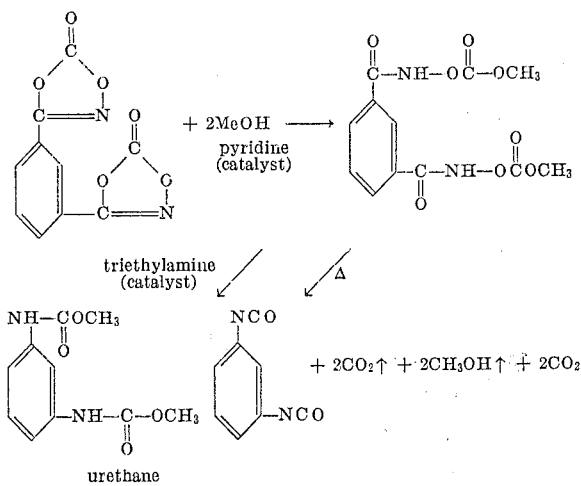

Representative of the more common nucleophilic compounds which can be reacted with the cyclic nitrile adducts of the invention are those discussed below under separate headings.

ORGANIC COMPOUNDS WITH ACTIVE HYDROGEN ATTACHED TO OXYGEN OR SULFUR

These compounds include aliphatic, aromatic and mixed aliphatic-aromatic monohydric and polyhydric alcohols and thiols; aliphatic, aromatic and mixed aliphatic-aromatic mono- and polycarboxylic acids, including the thioacids; aliphatic, aromatic and mixed aliphatic-aromatic sulfonic acids; hydroxyl-containing mono- and polyesters and hydroxy, thiol, acid and thioacid-terminated polymeric materials.

Representative of aliphatic and aromatic monohydric alcohols are methanol, ethanol, propanol, butanol, pentanol, pentenol, hexanol, heptanol, decanol, butenol, and the like, and the thiol analogues thereof, the phenols, naphthols, xylenol, tolyl alcohols, etc. and the thiol analogues thereof. The aliphatic and aromatic polyhydric alcohols and thiols include, for example, ethylene glycol, diethylene glycol, thiodiethylene glycol, propylene glycol, 1,3-butylene glycol, 1,6-hexanediol, butenediol, butynediol, amylene glycols, 2-methylpentanediol-2,4, 1,7-heptanediol, glycerine, neopentyl glycol, trimethylol propane, triethanol amine, pentaerythritol, cyclohexane dimethanol, sorbitol, mannitol, galactitol, talitol, xylitol, 1,2,5,6-tetrahydroxyhexane, styrene glycol, bis(β-hydroxyethyl)diphenyl-dimethylmethane, silanediols, e.g. triphenyl silanols, 1,4-dihydroxybenzene and the thiol analogues thereof.

Illustrative of aliphatic and aromatic carboxylic acids are formic, acetic, pentanoic, hexanoic, ricinoleic acid, hydroxystearic acid and the like, saturated and unsaturated fatty acids; benzoic acid, naphthoic acid, succinic, oleic, adpic, methyladipic, sebacic, glutaric, pimelic, azelic, suberic acids, maleic, fumaric, itaconic, citraconic acids, and the like, phthalic, terephthalic, isophthalic, and 1,2,4-benzene tricarboxylic acids, hydroxy carboxylic acids such as β-hydroxypropionic acid, α- and β-hydroxybutyric acid, m- and p-hydroxybenzoic acid and salicylic acid. Sulfur-containing acids include, for instance, thiodiglycolic acid, thiodipropionic acid, ethane thiolic acid, butene thionic acid, pentane thionothiolic acid, benzene thionic acid, 1,2-ethane disulfonic acid, 1,4-phenylene disulfonic acid, and the like.

The active hydrogen-containing polymeric compounds useful in this invention include, for instance, polyhydric polyalkylene ethers, hydroxyl monoesters and polyesters, hydroxyl group-containing, preferably hydroxyl-group terminated, polymers, and the thiol analogues thereof. The polyhydric polyalkylene ethers may have a molecular weight greater than about 750 and an hydroxyl number of from about 40 to 150 and may be derived, for example, by the polymerization of alkylene oxides such as ethylene oxide, propylene oxide, butylene oxide and the like. Polyhydric polyalkylene ethers may also be prepared by the polymerization of the cyclic ethers such as, for example, dioxane, tetrahydrofuran and the like, and by the condensation of an alkylene oxide with a glycol such as ethylene glycol, propylene glycol, butylene glycol and the like.

The hydroxy-containing mono- and polyesters may be obtained by the reaction of aliphatic or aromatic mono- or dicarboxylic acids with aliphatic or aromatic mono- or polyhydric alcohols in the manner well known to the art in proportions that result in esters having at least one reactive hydroxy group. Suitable mono acids include any of those enumerated above in the discussion of suitable acid reactants. Any mono- or polyhydric alcohols or thiols may be used to form the hydroxy or thiol esters and illustrative of such alcohols are those listed above in the discussion of suitable alcohols as the active hydrogen-containing reactant. Included within the suitable esters are the mono- and diglycerides, and hydroxyl-containing castor oil, tall oil, soya oil, linseed oil, etc. The latter esters are usually prepolymers prepared by the reaction of the fatty glyceride with low molecular weight polyols. Illustrative, for instance, of castor oil-based prepolymers are: propylene glycol mono-ricinoleate, propylene glycol mono-12-hydroxystearate, neopentyl glycol monoricinoleate, dehydrated castor oil, ethylene glycol monoricinoleate, ethylene glycol mono-12-hydroxystearate, triglyceride of ricinoleic acid, epoxidized castor oil, and pentaerythritol tetraricinoleate. Other suitable polymeric compounds include the hydroxyl- or thiol- or acid-terminated olefin polymers such as those of 1,4-butadiene, isoprene, 2,3-dimethylbutadiene, 2-chloro-1,3-butadiene, 2-cyano-1,3-butadiene, and other polymerizable, ethylenically unsaturated monomers such as α-olefins of up to 12 carbon atoms such as ethylene, propylene, butene, etc.; styrene, acrylonitrile, acrylic acid or ester, methacrylic acid or ester, vinyl chloride, vinylidine chloride and the like; hydroxyl-terminated condensates of phenol and lower aldehydes and hydroxy-terminated polyepoxides.

ORGANIC COMPOUNDS WITH ACTIVE HYDROGEN ATTACHED TO NITROGEN

These compounds include, for example, aliphatic and aromatic mono- and polyamines, mono- and polyamides (including thioamides), mono- and polyimines and imides. Suitable amines include methylamine, ethylamine, propylamine, butylamine, pentenylamine, octylamine, decylamine, stearylamine, oleylamine and the like, aniline, toluidine, n-alkylanilines, p,p'-diphenylamine, triphenylamine, phenylamine, α- and β-aminonaphthalenes, 2,5-diaminonaphthalene, methane diamine, ethylene diamine, hydroxylamine, hexamethylene diamine, diethylene triamine, tetraethylene pentamine, cyclohexylene diamine, laudoguanamine, etc.; p-phenylene diamine, 4,4'-methylene-bis(2-chloroaniline) (MOCA), 3,3'-dichlorobenzidine (DCB), N,N'-disecondary butyl-p-phenylene diamine, N,N'-dibenzylethylene diamine, diamino diphenyl ethers, p,p'-diamino diphenylmethane, polyphenylmethylene polyamines, etc.

Aliphatic and aromatic mono and polyamides, sulfonamides, sulfonimides, and amine or imine-terminated polymeric materials include thioamides such as acetamide, propioamide, butanamide, pentanamide, hexanamide, heptenamide, decanamide, dodecenylamide, octadecaamide, and the like thioamides; adipamide, succinamide, sebacamide, phenylamide, iso- and terephthalamide, and the like, and the thio analogues of these compounds. The aliphatic and aromatic mono- and polyimines and imides include, for example, ethylenimine, propylenimine, piperidine, and like, piperazine, diphenylimine, polyethylenimine, imidazole, histamine, imidazolone, succinimide, phthalimide, etc. Illustrative of suitable sulfonamides are 1,4-butanedisulfonamide, 1,2-ethanedisulfonamide, 1,4-cyclohexanedisulfonamide, 1,3-propanedisulfonamide, sulfanilamide etc. Representative sulfimides include dimethylsulfimide, diethylsulfimide, and the like, diphenylsulfimide, etc. Amine and imine-terminated polymeric materials include the amine and imine-terminated polymers described above in the discussion of compounds containing active hydrogens attached to an oxygen atom.

ORGANIC COMPOUNDS CONTAINING ACTIVE HYDROGENS ATTACHED TO BOTH OXYGEN AND NITROGEN ATOMS

These compounds include, for instance, amino alcohols such as ethanolamine, diethanolamine, 3-aminopropanol, 4-aminopropanol, 5-aminopentanol, 6-aminohexanol, 10-aminodecanol, p-aminophenol, 6-amino-5-methylhexanol, p-hydroxybenzolamine; imino alcohols such as iminothanol, iminopentanol, iminoquinoline; aminocarboxylic acids such as β-aminopropionic acid, piperidic acid, glycine, aminobenzoic acid, aminosuccinic acid, anthranilic acid and imino acids such as iminoacetic acid, iminopropionic acid and iminodecanoic acid.

NUCLEOPHILIC COMPOUNDS ASSOCIATED WITH A POSITIVE METAL OR AMMONIUM ION

Representative of nucleophiles associated with positive metal or ammonium ions are alkaline metal and ammonium salts of fatty acids such as sodium, potassium, calcium and ammonium acetate, propionate and the like, Grignard regents (RMgX), sodium methoxide, alkaline metal and ammonium salts of polycarboxylic acids such as sodium, potassium, calcium and ammonium succinate, adipate, malonate, sebacate, terephthalate, isophthalate etc.; alkali and ammonium naphthanide, alkali metal phenates, alkali metal and ammonium amides and imides, the sodium salt of phenylacetonitrile, positive metal ion-containing organometallic compounds such as butyl lithium, potassium cyclopentadiene and the like.

The novel hydroxamates (Type I) and the Type II reaction products will be discussed below under separate headings.

THE HYDROXAMATE COMPOUNDS

The novel hydroxamate compounds of the invention can be represented by the following structures A, B, C, and D.

(A) Monomeric hydroxamates:

$$\left( R'-\overset{O}{\underset{\underset{Z}{|}}{C}}-N-O-X-\overset{(R'')_{n'}}{\underset{(R'')_{n''}}{T}} \right)_x -Q$$

(B) Hydroxamates terminated with cyclic nitrile adduct groups:

$$\left[ \left( \overset{X}{\underset{N=C}{O \diagup \diagdown O}} \right)_p + R'-\overset{O}{\underset{\underset{Z}{|}}{C}}-N-O-X-\overset{(R'')_{n'}}{\underset{(R'')_{n''}}{T}} \right]_{x'} -Q$$

(C) Hydroxamate prepolymer terminated with residue of nucleophile after loss of Z:

$$\left[ Q-\overset{(R'')_{n'}}{\underset{(R'')_{n''}}{T}}-X-O-N-\overset{O}{\underset{Z}{\overset{||}{C}}}-R' \right]_x$$

(D) Polymers:

$$\left[ -\overset{(R'')_{n'}}{\underset{(R'')_{n''}}{T}}-X-O-N-\overset{O}{\overset{||}{C}}-R'-\overset{O}{\overset{||}{C}}-N-O-X-\overset{(R'')_{n'}}{\underset{(R'')_{n''}}{T}}-Q- \right]_m$$

In the structures A through D, R' is as defined above in the discussion of the hydroxamic acids used in the preparation of the cyclic nitrile adducts of the invention;

X is $$-\overset{O}{\overset{||}{C}}-, \quad -\overset{O}{\overset{||}{S}}-, \quad \text{or} \quad -\overset{O}{\overset{||}{C}}-\overset{O}{\overset{||}{C}}-$$

$x$ is an integer of 1–3; Z is hydrogen, a positive metal ion or ammonium ion; T is an oxygen, nitrogen, sulfur or carbon atom; Q is a hydrocarbon radical, monomeric or polymeric, having a molecular weight of at least 14 up to 75,000 or more, i.e., containing carbon and hydrogen but does not exclude the presence of other atoms such as oxygen in the main chain or as side chains; $x'$ is an integer of at least 1 up to the functionality of Q, usually 2 to 6 or 20 or more; R'' is hydrogen or Q, $n'$ and $n''$ are 0 to 1 with the proviso that when T is oxygen or sulfur $n'$ and $n''$ are 0, and when T is nitrogen or carbon, $n'$ is 1 and $n''$ is either 0 or 1; $m$ is an integer greater than 0; $p$ is an integer having a value of 1 to 3; and the radical $$-\overset{|}{\underset{|}{T}}-Q$$

represents the same or different residues of the nucleophile after removal of Z, that is, the active hydrogen or active positive ion from nucleophilic compound. In the definition of $x'$, by the functionality of Q is meant the number of free nucleophilic groups, that is, active hydrogens or positive metal or ammonium ion present on Q which can react with the cyclic nitrile adduct of the invention.

The following reactions will illustrate preparation of the novel hydroxamates of the invention when the nucleophilic compound reacted is an hydroxy-containing reactant and the cyclic nitrile adduct is a carbonate. In this instance the —T— in the above structures of the hydroxamate compound is oxygen and X is $$-\overset{O}{\overset{||}{C}}-$$

It is to be understood, however, that hydroxamates of the invention wherein T is nitrogen, sulfur or carbon can be prepared by employing, respectively, compounds having an active hydrogen attached to a nitrogen atom, compounds having an active hydrogen attached to a sulfur atom or nucleophiles associated with a positive metal or ammonium ion. Like, similar products can be prepared using the cyclic nitrile sulfide and oxalate adducts.

Mononitrile adduct + monoalcohol:

$$R-\overset{O}{\overset{||}{C}}\diagdown_{O\diagup\diagdown O}^{N} + HOQ \longrightarrow R\overset{O}{\overset{||}{C}}-N-O-\overset{O}{\overset{||}{C}}OQ$$
$$\qquad\qquad\qquad\qquad\qquad\quad H$$

Dinitrile adduct (excess) + polyol:

$$N=C-R-\overset{O}{\overset{||}{C}}\diagdown_{O\diagup\diagdown O}^{N} + HOQOH \longrightarrow \text{(excess)}$$

$$\overset{O}{\overset{||}{C}}\diagdown_{O\diagup\diagdown O}^{N=C-R-\overset{O}{\overset{||}{C}}-N-O-\overset{O}{\overset{||}{C}}-O-Q-O-\overset{O}{\overset{||}{C}}-O-N-\overset{O}{\overset{||}{C}}-R-\overset{O}{\overset{||}{C}}=N}$$

Dinitrile adduct + excess polyol:

$$N=C-R-C=C + \text{excess } HOQOH \longrightarrow$$

$$HOQO-\overset{O}{\overset{||}{C}}-O-N-\overset{O}{\overset{||}{C}}-R-\overset{O}{\overset{||}{C}}-N-O-\overset{O}{\overset{||}{C}}-OQOH$$
$$\qquad\qquad\qquad H \qquad\qquad\qquad\qquad H$$

Dinitrile+polyol in equivalents near unity:

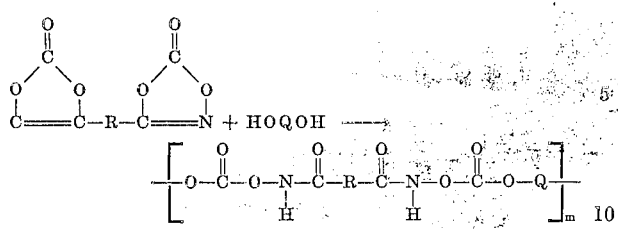

Examples of monohydroxamates of the invention are carbomethoxy benzohydroxamate and carbomethoxy propiohydroxamate. Dihydroxamates of the invention include carbomethoxyisophthalohydroxamate and carboisopropyladipohydroxamate. Illustrative of cyclic nitrile adduct group-terminated monohydroxamates are carbomethoxy hydroxamyl adipomononitrile carbonate and carbomethoxyhydroxamyl isophthalomononitrile carbonate, while hydroxy group-terminated monohydroxamates of the invention are exemplified by carbo-4-hydroxylbutoxy propriohydroxamate and carbo-4-hydroxybutoxy benzohydroxamate. Dihydroxy-terminated dihydroxamates include carbo-3-hydroxy propoxy adipohydroxamate and carbo-4-hydroxybutoxy isophthalohydroxmate. Illustrative of dicyclic nitrile adduct group-terminated prepolymers are 1,4-carbobutoxy dihydroxamyl diterephtalomononitrile carbonate and 1,4-carbobutoxy dihydroxamyl diadipomononitrile carbonate. Examples of polymeric hydroxamates are p-vinyl carbomethoxy benzohydroxamatestyrene copolymers, p-vinyl carbomethoxy-benzohydroxamate-acrylic acid-styrene terpolymers, etc.

In addition to their value in the production of products such as urethanes and ureas the novel hydroxamates of the invention can be used in the production of thermoplastic crosslinked materials. For instance, the cyclic trile adducts of the invention can be reacted with for instance hydroxy group-containing polymers or alternatively, cyclic nitrile adduct group containing polymers can be reacted with polyols to produce thermoplastic materials containing the hydroxamates as cross-links between polymer chains which crosslinks are thermally unstable and break down with mild heating to isocyanate groups and the corresponding nucleophile. The resulting material can be easily molded or cast after which operation crosslinks reform by reaction of the isocyanate group and the nucleophilic compound (e.g., a polyol) to give a thermoset material. Thus, the novel hydroxamates provide a method of making molds of thermoset materials such as crosslinked polyurethanes without resorting to relatively high temperateures ordinarily required to render crosslinked polyurethanes moldable and therefore without the product degradation that often accompanies use of such high temperatures.

Another advantage of the novel hydroxamates is the fact that they contain an internal or "built in" blowing agent in their structure; that is, the sulfur dioxide, carbon dioxide and carbon monoxide they evolve upon decomposition. This feature can be utilized in the preparation of foamed materials as will be discussed below. This "built in" blowing agent characteristic of the novel hydroxamates provides a further advantage in that it offers a better control of gas evolution in foam material production.

Mono- and polyamines can be obtained from the corresponding hydroxamates by decomposing them in aqueous alkali metal hydroxide, e.g. sodium hydroxide, whereby they undergo a Lossen rearrangement to the isocyanate. The isocyanate can then be hydrolyzed to the amine.

Also, the hydroxamate compounds of the invention wherein Z in the general formula is a positive metal having a valence of 2 or more as in the case of $Zn^{++}$, $Ca^{++}$, etc., offer the advantage of effecting ionic bonds between, for instance, proton-accepter polymer chains thereby providing ionomeric materials.

TYPE II PRODUCTS OF THE INVENTION

In the preparation of the Type II products of the invention, the reaction may be carried out as a single stage operation or in multiple stages employing more of the same or different cyclic nitrile adduct reactant or the same or different Z-containing nucleophilic compound. Thus, in Type II polymer product production, the process, for example, may be what is termed in the art as a "one-shot" process. Alternatively, a prepolymer of the nitrile reactant and the active hydrogen-containing reactant can be prepared by employing an excess of either reactant but preferably an excess of the cyclic nitrile adduct reactant. The prepolymer formed may then be subsequently reacted with either more of the same or a different cyclic nitrile adduct reactant or with more of the same or a different nucleophile depending on the groups terminating the ends of the prepolymer.

When the nucleophilic compound contains an active hydrogen in an —OH group, mono- or polyurethane products are prepared, while if the group containing the active hydrogen is an —$NH_2$ group, mono- or polyurea products are obtained. Reaction of the cycle nitrile adduct reactant with both an hydroxy group-containing compound and a —$NH_2$ group-containing compound, either simultaneously or sequentially provides urea-urethane products. Preparation of urea-urethane polymers may be illustrated by the following reaction employing for purposes of illustration a diol and diamine as the active hydrogen-containing reactants:

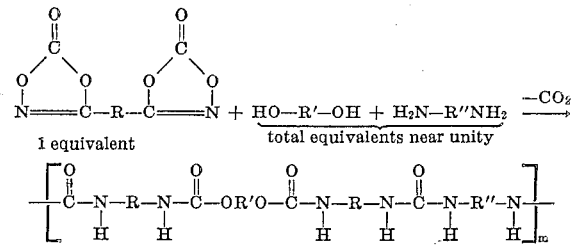

As may be noted from the illustrative Type II product reactions generally set out above, to which the invention is applicable, when a polynitrile adduct reactant, such as the dinitrile adduct, is reacted with a monofunctional active Z-containing nucleophile or an excess of the polynitrile adduct is reacted with a difunctional Z-containing nucleophile, a novel class of compounds can be obtained having the following structure:

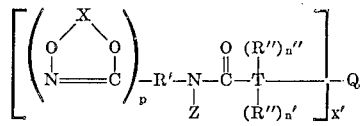

wherein X, R', Z, T, R'', $n'$, $n''$, Q, $x'$, p and

are as defined above in the discussion of the structures above of the novel hydroxamate compounds of the invention. The following illustrate the various novel cyclic nitrile adduct group terminated Type II compounds and the reactions that produce them.

Nitrile adduct+polyol:

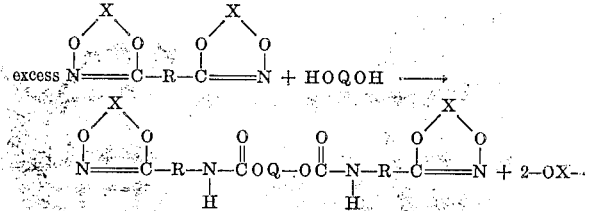

Nitrile adduct + diamine:

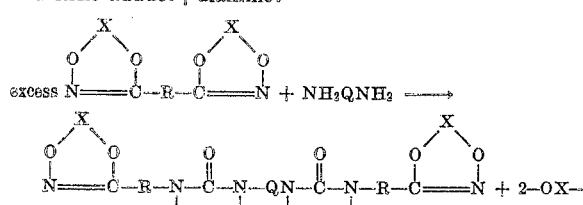

Nitrile adduct + disecondary amine:

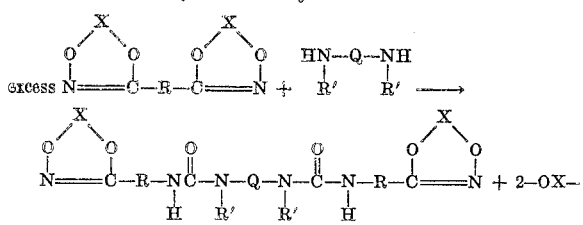

R' = alkyl

Nitrile adduct + dicarboxylic acid:

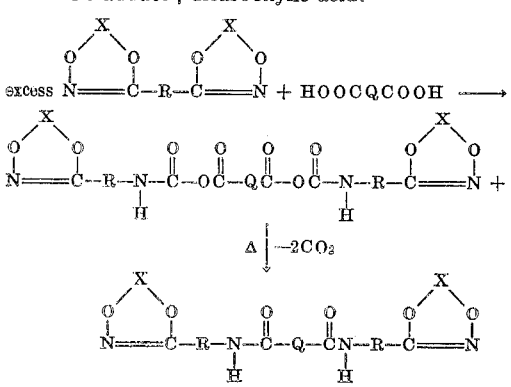

Nitrile adduct + disulfonic acid:

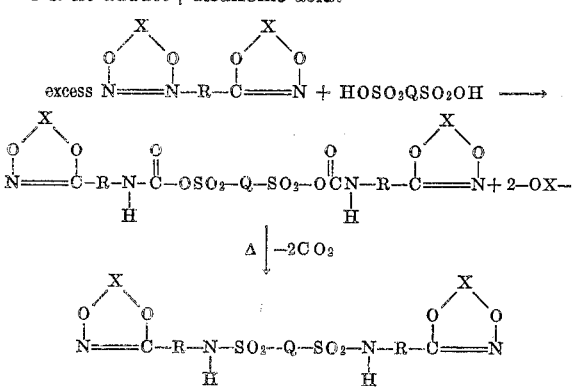

Nitrile adduct + thiol:

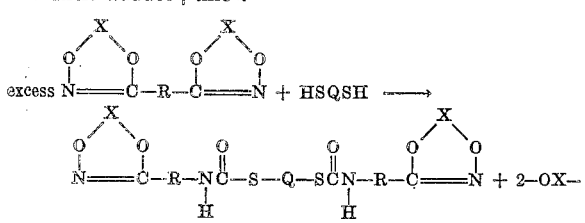

Nitrile adduct + monohydric alcohol:

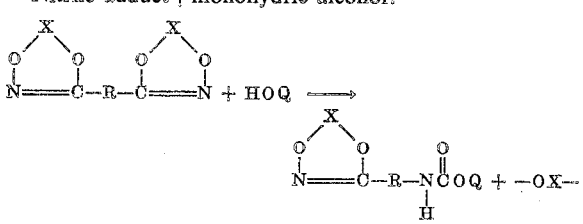

Nitrile adduct + monoamine:

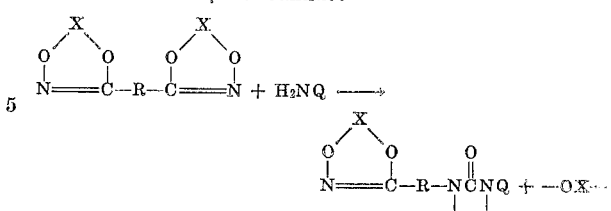

Nitrile adduct + sodium adipate:

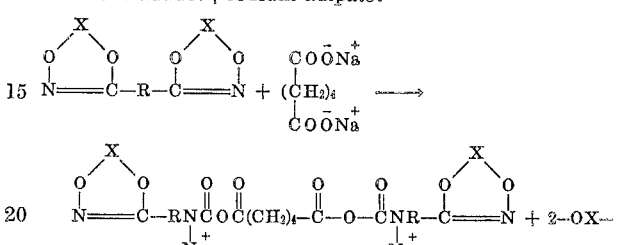

Nitrile adduct + amide:

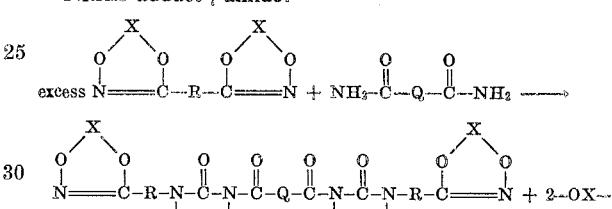

As aforementioned, the cyclic nitrile adducts group,

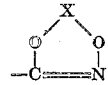

terminating these novel products of the invention may be decomposed to isocyanate groups. However, as in the case of the cyclic nitrile group-terminated hydroxamates, the cyclic nitrile adduct group terminated Type II products of the invention offer distinct advantages over the prior art isocyanates in that the latter exhibit toxicity and stability problems. Thus, the nitrile group-terminated Type II products of the invention lend themselves especially to use as prepolymers which may be stored until such time as it is desired to produce the final polymer product by subsequent reaction with more of the same Z-containing nucleophile or a different Z-containing nucleophile.

The nitrile groups of the starting materials of the invention are not of equal thermal stability; the relative stabilities being as follows.

Nitrile carbonate (most stable):

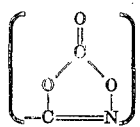

Nitrile oxalate (less stable):

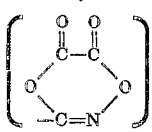

Nitrile sulfite (least stable):

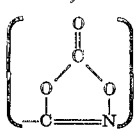

The fact that the cyclic nitrile groups are not of equal stability permits the production of polymeric compounds having one terminal end capped or blocked with a nitrile group and the other end capped with an isocyanate group. By way of example, polymers having dissimilar terminal nitrile groups, for instance, a nitrile carbonate group on one end and a nitrile sulfite group on the other end, can be prepared by using a mixture of different cyclic nitrile adducts or introducing a different cyclic nitrile adduct during the reaction. Since the nitrile carbonate group is thermally stable at temperatures at which the nitrile sulfite group readily decomposes, products having a nitrile carbonate group terminating one end and an isocyanate group terminating the other end are prepared.

It is possible in accordance with the present invention to produce cellular or nonporous plastics including films, coatings, adhesive layers, impregnated compositions, castings, moldings and the like. However, in the production of polyurethane foams by the process of the invention it is not necessary as in conventional prior art processes to employ an extraneous foaming or blowing agent since the cyclic nitrile adduct reactants of the invention contain their own internal or "built in" blowing agent in the carbon dioxide, carbon monoxide and sulfur dioxide gas they evolve during reaction with the nucleophilic compounds. Conventional foaming agents, however, may be employed, if desired, among which may be listed, low boiling solvents such as benzene, toluene, acetone, ethyl ether, butyl acetate, methylene dichloride, carbon tetrachloride and the like, agents which will decompose to evolve an inert gas as, for instance, ammonium carbonate, sodium bicarbonate, N,N'-dimethyl N,N'-dinitroso-terephthalamide, para,para'-oxybis (benzene-sulfonyl hydroxide), azodicarbonamide, benzene sulfonyl hydrazide, azodiisobutyronitrile, para-tertiary butyl benzoylazide and the like.

Formulation of polyurethane foams can follow the well established practice of the art with the notable exception that the conditions of the reaction between the nitrile adduct compound and nucleophilic compound be controlled to effect the reaction at a rate slow enough to preclude escape of the evolved $CO_2$, $CO$ or $SO_2$ gas before sufficient gelation necessary to entrap the evolved gas and form a cellular estromeric polyurethane has occurred. Ordinarily, the desired reaction speed can be acquired by selection of a suitable catalyst concentration, usually below about 0.1% by weight of the reactants. Catalyst concentrations much above this level tend to liberate the gas prior to the establishment of sufficient gelation to cause entrapment.

If desired, surface active agents might be used in concentration of about 1 to 5% by weight of the reactants to stabilize the foam. Generally used are silicone emulsifiers and non-ionic surface agents such as ethylene oxide condensates of vegetable oils, alcohols, and organic acids.

Thus, in accordance with another embodiment of the present invention, storage stable compositions can be prepared by mixing one or more of either the cyclic nitrile adduct reactant, the novel cyclic nitrile-terminated Type II products represented above by the structure:

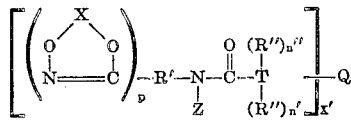

the novel cyclic nitrile adduct group-terminated hydroxamate compounds represented above by the structure:

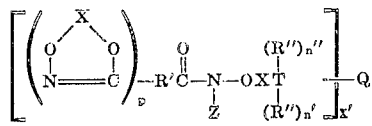

or mixtures thereof with a nucleophilic compound non-reactive at ambient temperatures with said nitrile reactant adduct, nitrile adduct terminated polymer or hydroxamate compounds. Typical of non-reactive active hydrogen-containing reactants are compounds wherein the active hydrogen is present as an hydroxyl group. Amine reactants in general are unsuited for preparation of storage stable compositions. Since the resulting mixtures will not react until the temperature is raised and/or catalyst is added, the mixtures can be conveniently stored in a single package. In accordance with the usual practice, inert inorganic and/or organic fillers and other additives may be included in the composition mixture. Suitable inert inorganic materials include, for example, clay, talc, silica, carbon black, asbestos glass, mica, calcium carbonate, antimony oxide and the like. Organic fillers include, for instance, the various polymers, copolymers and terpolymers of vinyl chloride, vinyl acetate, acrylonitrile, acrylamide, styrene, ethylene, propylene, butadiene, divinylbenzene, etc. Other additives which may be added include plasticizers such as dioctyl phthalate, di-2-hexyl adipate, etc., extenders, softeners, coloring agents and emulsifiers.

The products produced by the invention have many uses. For example, the products are excellent materials for use in the preparation of castings, molds, sealants, potting compounds, fertilizers, insecticides, adhesives, coatings, films, etc.

Storage stable, curable composition of the present invention are readily cured by maintaining the compositions at temperatures of at least about 20° C. up to below the degradation point of the desired polymer product, generally up to about 200° C. The time required for polymerizing and curing the compositions will vary according to the particular ingredients and temperatures used. Use of catalysts may also shorten the curing time. In general, curing times may range from 2 to 3 minutes to 24 hours or more.

The following Examples XXII through XXVIII further illustrate the preparation of the novel hydroxamate compounds of the present invention but are not to be considered limiting.

EXAMPLE XXII

Preparation of carbomethoxyisophthalyl hydroxamate from isophthalodi(nitrile carbonate) via pyridine catalysis To 50 ml. of methanol in a 250 ml. Erlenmeyer flask fitted with a condenser and a magnetic stirring bar are added 0.5 ml. of pyridine and 5.0 g. of isophthalodi(nitrile carbonate). The resulting mixture is stirred at the reflux temperature of methanol for one hour, cooled and the methanol removed under vacuum. The resulting residue is recrystallized from isopropyl alcohol to give 3.0 g. of carbomethoxyisophthalyl hydroxamate, decomp. point 138°.

The infrared spectrum (Nujol mull) of the recrystallized material shows a significant absorption band at 5.55 microns which we have assigned to the carbomethoxy carbonyl, a significant band at 5.95 microns characteristic of amide carbonyl and a strong absorption band at 8.15 microns characteristic of

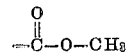

stretching.

The NMR spectrum (in $D_6$ dimethylsulfoxide) shows the absorption characteristic of methyl groups in methyl esters and integration of peak heights gives a 1.36 to 1 ratio of methyl hydrogen to aromatic hydrogen, respectively.

EXAMPLE XXIII

Preparation of the hydroxamate of Example XXII from isophthalodi(nitrile carbonate) via aluminum chloride catalysis To 50 ml. of methanol in a 250 ml. Erlenmeyer flask fitted with a condenser and a magnetic stirring bar are added 0.1 g. of aluminum chloride and 5.0 g. of isophthalodi(nitrile carbonate). The resulting mixture is stirred at the reflux temperature of methanol for one hour, cooled and filtered to remove the aluminum chloride. The methanol is then stripped from the filtrate under vacuum and the resulting residue recrystallized from isopropyl alcohol to give 3.4 g. of dicarbomethoxyisophthalyl hydroxamate, decomp. point 147–149° C.

The infrared spectrum (Nujol mull) was identical to the product of the pyridine catalyzed reaction of Example XXII.

EXAMPLE XXIV

Preparation of the product of Example XXII from isophthalodi(nitrile carbonate) via boron trifluoride catalysis To 50 ml. of methanol in a 250 ml. Erlenmeyer flask equipped with a condenser and a magnetic stirring bar was added 5.0 g. of isophthalodi(nitrile carbonate) and 10 ml. of a 1% solution of boron trifluoride in methanol. The resulting mixture is stirred at the reflux temperature of methanol for one hour then cooled. Identification of the reaction product is made by adding one drop of the reaction mixture to NaCl plates, evaporating off the methanol and taking an I.R. spectrum of the residue. The I.R. spectrum so taken is identical to the I.R. spectrum of the product obtained in the pyridine catalyzed reaction of Example XXII.

EXAMPLE XXV

Preparation of polycarboalkoxy hydroxamate from isophthalodi(nitrile carbonate)

To 50 ml. of acetonitrile in a 250 ml. Erlenmeyer flask fitted with a condenser and a magnetic stirring bar are added 1 ml. of a 33 percent solution of Dabco catalyst in propylene glycol, 5 ml. of polypropylene glycol (PPG-150) and 5.0 g. of isophthalodi(nitrile carbonate). The resulting mixture is heated with stirring for 16 hours at 38 C. The acetonitrile is then evaporated off leaving a polycarboalkoxy hydroxomate as a viscous gum.

The infrared spectrum of the reaction mixture is taken by adding one drop of the reaction mixture to NaCl plates and evaporating off the acetonitrile. The infrared spectrum (neat) shows a significant band at 5.59 microns which we have assigned as the carboalkoxy carbonyl, a significant band at 6.05 microns characteristic of an amide carbonyl and a significant band at 8.13 microns characteristic of

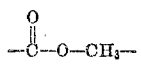

stretching.

EXAMPLE XXVI

Preparation of polycarboalkoxy hydroxamate from isophthalodi(nitrile carbonate)

To 50 ml. of acetonitrile in a 250 ml. Erlenmeyer flask fitted with a condenser and a magnetic stirring bar are added 0.6 ml. of triethylamine, 5 ml. of polypropylene glycol (PPG-150) and 5.0 g. of isophthalodi(nitrile carbonate). The resulting mixture is heated with stirring for 6 hours at 38° C. The acetonitrile is then evaporated off leaving a polycarboalkoxy hydroxamate as a viscous gum.

The infrared spectrum of the reaction mixture is taken by adding one drop of the reaction mixture to NaCl plates and evaporating off the acetonitrile. The infrared spectrum (neat) shows a significant band at 5.59 microns which we have assigned as the carboalkoxy carbonyl, a significant band at 6.05 microns characteristic of an amide carbonyl and a significant band at 8.13 microns characteristic of

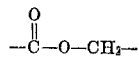

stretching.

EXAMPLE XXVII

Preparation of a cyclic nitrile carbonate-terminated carboalkoxy hydroxamate prepolymer from polypropylene glycol To 50 ml. of acetonitrile in a 250 ml. Erlenmeyer flask equipped with a condenser and a magnetic stirring bar is added 10 g. 0.04 mole) of isophthalodi(nitrile carbonate), 3 g. (0.02 mole) of polypropylene glycol M.W. approx. 150) and 0.5 ml. of triethylamine. The reaction mixture was stirred and the temperature kept below 30° C. during the entire reaction. The reaction mixture is allowed to react for 2 hours then the reaction mixture is analyzed by infrared analysis by taking a drop of the reaction mixture and placing it on NaCl plates. The acetonitrile is then allowed to evaporate off and the infrared spectrum taken of the resulting glass. The infrared spectrum shows the presence of both the unreacted carbonate groups by absorption bands at 5.35 microns and the presence of the hydroxamate by an absorption band at 5.55 microns. The product is identified, therefore, as a cyclic nitrile carbonate-terminated hydroxamate prepolymer having the following structure:

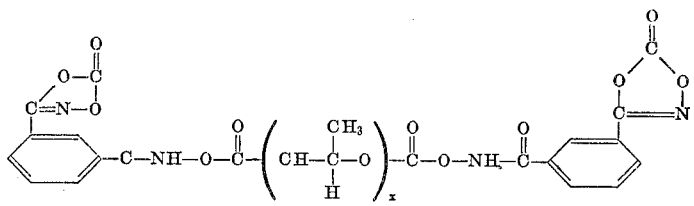

EXAMPLE XXVIII

Hydroxamate from sodio malononitrile and isophthalodi(nitrile carbonate)

To 100 ml. of tetrahydrofuran which has been freshly distilled over calcium hydride into a 300 ml. three-necked round bottom flask equipped with a condenser, drying tube, dropping funnel and mechanical stirrer and containing 13.2 g. (0.2 mole) of malononitrile is added 4.8 g. (0.2 mole) of sodium hydride. To this stirred reaction mixture maintained at 0° C. is added dropwise 100 ml. of the freshly distilled tetrahydrofuran containing 24.8 g. (0.1 mole) of isophthalodi(nitrile carbonate) is added dropwise. The temperature is maintained at 0° C. throughout the entire addition then the reaction mixture is allowed to come to room temperature. The reaction mixture is neutralized with hydrochloric acid then the solvent removed under vacuum. The remaining residue is a white solid decomposing at 118° C. The product when analyzed by infrared analysis shows an amide absorption band and an ester absorption band. The product, therefore, is identified as having the following structure:

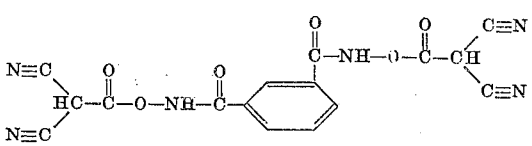

The following examples further illustrate the Type II Products produced by the reaction of the invention.

EXAMPLE XXIX

Preparation of cyclic nitrile carbonate terminated prepolymer from polypropylene glycol A mixture of 1 mole of polypropylene glycol (M.W. approx. 150) and 2 moles of the terephthalodi(nitrile carbonate) prepared as described in Example XVII above was placed in a reaction flask and heated to 50–80° C. No evidence of chemical reaction was observed. To this mixture (at ambient temperature) was then added 0.5% by weight of Dabco (diazabicyclooctane). The mixture was then heated at 50–80° C. wherein a reaction took place as evidenced by the liberation of carbon dioxide from the reaction mixture. After heating for approximately 8 hours, the resulting mixture was analyzed by infrared analysis, which showed the presence of both urethane groups and cyclic nitrile carbonate groups. The product was identified, therefore, as a cyclic nitrile carbonate terminated polyether prepolymer having the following structure:

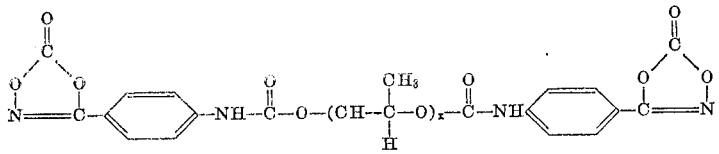

This prepolymer may be employed to prepare elastomeric and foamed elastomeric urethane products as described in subsequent examples.

EXAMPLE XXX

Preparation of cyclic nitrile carbonate terminated prepolymer from hydroxyl-terminated polybutadiene A mixture of 1 mole of hydroxyl-terminated polybutadiene and 2 moles of terephthalodi(nitrile carbonate) prepared as described in Example XVII above, is reacted at 60–80° C. using 0.3% by weight of N,N-dimethyl aniline catalyst. After about 5 hours reaction time the product when analyzed by infrared is found to be comprised of both urethane and cyclic nitrile carbonate functional groups. This prepolymer may be employed to prepare elastomeric urethane products as described in subsequent examples.

EXAMPLE XXXI

Preparation of cyclic nitrile carbonate terminated prepolymers from hydroxyl-terminated polyester A mixture of 1 mole of hydroxyl-terminated polyester (having a molecular weight of 3500 and prepared from adipic acid and ethylene glycol) and 2 moles of terephthalodi(nitrile carbonate) is heated at 100–200° C. in the presence of 0.5% (by wt.) of Dabco (diazobicyclooctane). After heating for a period of about 12 hours, the mixture appears to have been completely reacted since the evolution of carbon dioxide ceases. Analysis of the product by infrared shows that both urethane and cyclic nitrile carbonate groups are present. The spectrum was in accord with the following structure:

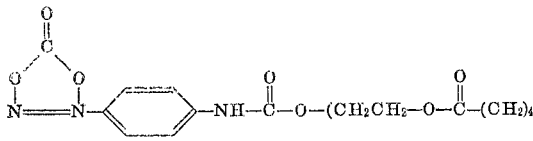

EXAMPLE XXXII

A similar prepolymer may be prepared by reacting polytetramethylene glycol and adipodi(nitrile carbonate) prepared by the procedure of Example XVIII, using the general procedure of Example XXIX.

EXAMPLE XXXIII

A similar prepolymer may be prepared by reacting mono-ricinoleic acid ester of polypropylene glycol and ter-ephthalodi(nitrile sulfite) employing the general procedure of Example XXIX.

EXAMPLE XXXIV

Reaction of polyether based cyclic nitrile carbonate prepolymer with 1,4-butane diol—Formation of a polyurethane elastomer One molar equivalent of the prepolymer described in Example XXIX is mixed with one molar equivalent of 1,4-butane diol. The resulting mixture does not react at ambient temperature. Although the original prepolymer containes 0.5% by weight of Dabco catalyst, an additional 0.2% of fresh catalyst is added to the mixture. The mixture is still stable at ambient temperature. The reaction mixture is then heated in a stirred resin kettle (under a nitrogen atmosphere) whereupon carbon dioxide begins to evolve (at 70° C.). The mixture becomes very viscous during the course of the reaction. The temperature is then raised 130° C. whereupon carbon dioxide evolution be-

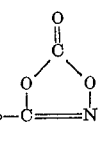

comes more rapid. After several hours of heating, the mixture gels to a very tough elastometric polyurethane composition showing good tensile, abrasion and resilience characteristics.

Elastomeric compositions of the aforementioned type are excellent materials for use in production of cast elastomers, caulks, sealants, potting compounds, adhesives, coatings and the like. Since the prepolymer and 1,4-butane diol can be mixed and stored in a single package at ambient temperature the desired elastomeric products are not produced until the mixture is heated to reaction temperature.

Of course, mineral fillers such as clays, talcs, silicas, etc., can be used in these formulations to improve properties and lower cost. Carbon black is also a useful filler for these materials. Plasticizers such as dioctyl phthalate, di-2-ethylhexyl adipate, etc. can also be employed as extenders, softeners, etc.

EXAMPLE XXXV

Production of foamed cellular polyurethane composition from cyclic nitrile carbonate terminated prepolymer and poly(oxypropylene)triol A mixture of 1 molar equivalent of the prepolymer described in Example XXIX and 1 molar equivalent of a poly(oxypropylene)triol is mixed with an additional 0.3% by weight of Dabco as catalyst. The mixture is poured into a square steel mold and heated at 90° C. in an air-circulating oven. Carbon dioxide is evolved as soon as the mixture becomes warm. Very soon after reaching 90° C., the mixture gels and the evolved carbon dioxide becomes entrapped in the mixture thereby forming a cellular elasto-

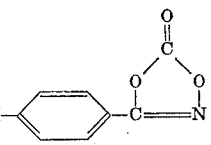

meric polyurethane containing both open and closed cell structures. The final product is removed from the oven after 2 hours.

EXAMPLE XXXVI

Production of one-step polyurethane elastomer products from cyclic nitrile carbonate and hydroxyl-terminated polybutadiene copolymer Into a resin kettle is charge 1 molar equivalent of a hydroxyl-terminated polybutadiene-styrene copolymer (M.W. approx. 2000) having a backbone structure comprised of 75% (by wt.) of butadiene and 25% by wt. of styrene. One molar equivalent of the nitrile carbonate prepared as described in Example XVII above is added and the mixture heated to 70° C. No reaction takes place, indicating that the reactants, without catalyst, may be maintained as a mixture for long periods of time without co-reacting. The mixture is then cooled to ambient temperature and 0.5% (by weight) of amine catalyst (Dabco) is added. The mixture is then again heated to 70–80° C., whereupon evolution of carbon dioxide commences. Gradually the mixture converts into a gelled elastomeric material showing good resilience characteristics.

Materials of this type could be formed as cellular elastomers or non-cellular elastomers. Since the evolution of carbon dioxide occurs during the course of the reaction, the entrapment of carbon dioxide within the elastomeric network produces either closed or open cell foam structures. Generally if the reaction takes place with small amounts of catalyst, e.g., 0.01%, the gelation occurs rather slowly so that the carbon dioxide is almost completely evolved before the gas is trapped. However, at higher catalyst concentrations, e.g., 0.1% or above, varying amounts of carbon dioxide is trapped within the elastomeric network, thereby forming a cellular elastomer.

EXAMPLE XXXVII

Preparation of m-phenylene dimethyl carbamate directly from isophthalodi (nitrile carbonate)

To 50 ml. of methanol in a 250 ml. Erlenmeyer flask filtered with a condenser and a magnetic stirring bar are added 0.7 ml. of triethylamine and 5.0 g. of isophthalodi (nitrile carbonate). The resulting mixture is stirred at the reflux temperature of methanol for one hour, cooled and the methanol stripped off under vacuum. The resulting residue is recrystallized from isopropyl alcohol to give 1.35 grams of m-phenylene dimethyl carbamate, M.P. 147–151° C. Yield 30.1%.

The infrared spectrum (Nujol mull) of the recrystallized material shows a significant absorption band at 3.1 microns characteristic of N—H stretching, a significant band at 5.87 microns characteristic of a urethane

and a strong absorption band at 7.98–8.06 microns characteristic of

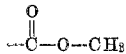

stretching.

EXAMPLE XXXVIII

Preparation of a polyurethane directly from isophthalodi(nitrile carbonate)

To the reaction set-up described in the preceding Example XXX are added 50 ml. of acetonitrile, 1 ml. of a 33 percent solution of Dabco as catalyst in propylene glycol, 5 ml. of polypropylene glycol (molecular weight of approx. 150) and 5.0 g. of isophthalodi(nitrile carbonate). The resulting mixture is heated 3 hours at the reflux temperature of acetonitrile, then cooled. Evaporation of the acetonitrile under vacuum leaves the polyurethane as a very viscous gum.

The infrared spectrum of the reaction mixture is taken by adding one drop of the reaction mixture to NaCl plates and evaporating off the acetonitrile. The infrared spectrum shows a significant band at 5.82 microns characteristic of urethane carbonyl absorption and a significant band at 8.15 microns characteristic of

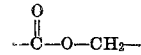

absorption. No bands were present at 5.35 and 5.45 microns which are characteristic of the starting di(nitrile carbonate).

EXAMPLE XXXIX

Preparation of a polyurethane directly from isophthalodi(nitrile carbonate)

To a reaction set-up identical to the one described in Example XXX above are added 50 ml. of acetonitrile, 0.6 ml. of triethylamine, 5.0 g. of polypropylene glycol (M.W. approx. 150) and 5.0 g. of isophthalodi(nitrile carbonate). The resulting mixture is reacted 3 hours at the reflux temperature of acetonitrile, then cooled. Evaporation of the acetonitrile under vacuum leave the polyurethane as a very viscous gum.

The infrared spectrum of the reaction mixture was taken by adding one drop of the reaction mixture to NaCl plates and evaporating off the acetonitrile. The infrared spectrum showed a significant band at 5.82 microns characteristic of urethane carbonyl absorption and a significant band at 8.15 microns characteristic of

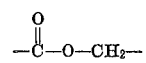

absorption. No bands were present at 5.35 and 5.45 microns which are characteristic of the starting di(nitrile carbonate).

EXAMPLE XL

Preparation of cyclic nitrile sulfite terminated prepolymers from polyoxypropylene diol A mixture of 1 mole of polyoxypropylene diol (M.W. approx. 2000), 2 moles of adipodi (nitrile sulfite) prepared as described in Example V and 0.5% by weight of triethylamine was placed in a reaction flask and heated to 70° C. A reaction took place as evidenced by the liberation of sulfur dioxide from the reaction mixture. After heating for four hours the resulting mixture is analyzed by infrared analysis which shows the presence of urethane groups by an absorption band at 5.90 microns and the presence of cyclic sulfite groups by absorption at 8.1 microns. The product is identified, therefore, as a cyclic nitrile sulfite-terminated prepolymer having the following structure:

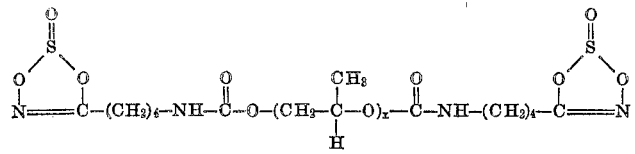

This prepolymer may be employed to prepare elastomeric and foamed elastomeric urethane products as described in a subsequent example.

EXAMPLE XLI

Reaction of polyoxy based cyclic nitrile sulfite terminated prepolymer with polypropylene glycol—formation of a polyurethane elastomer Into a resin kettle is charged 1 molar equivalent of polypropylene glycol (M.W. approx. 150) and 1 molar equivalent of the cyclic nitrile sulfite-terminated prepolymer described in Example XL above. Although the original prepolymer contains 0.5% weight of triethylamine, an additional 0.1% of fresh catalyst is added to the mixture. The reaction mixture is then heated with stirring to 70° at which point sulfur dioxide evolution is quite rapid. The reaction mixture becomes very viscous during the course of the reaction. After three hours the mixture has gelled to a very tough elastomeric polyurethane composition showing good tensile, abrasion and resilience characteristics.

EXAMPLE XLII

Preparation of cyclic nitrile carbonate-cyclic nitrile sulfite-terminated prepolymer from polypropylene glycol Into a resin kettle is charged 1 mole of polypropylene glycol (M.W. approx. 150) and 1 mole of terephthalo di(nitrile carbonate) prepared as described in Example XVII above. The reaction mixture while stirring is heated to 60° under vacuum to remove moisture. No reaction takes place under these conditions. The reaction mixture is cooled and 0.5% by weight of triethylamine is added and the reaction mixture heated to 70° C. for two hours. Then one mole of the terephthalo di(nitrile sulfite) is added and the resulting mixture heated at 70° C. for two hours. The reaction mixture is cooled, then to it is added 1 mole of terephthalic di(nitrile sulfite) and the reaction mixture heated at 70° C. for four more hours. The resulting mixture is analyzed by infrared analysis which shows the presence of urethane absorption at 5.9 microns, the presence of cyclic nitrile sulfite absorption at 8.13 microns and the presence of cyclic nitrile carbonate absorption at 5.35 and 5.45 microns. The product is identified, therefore, as a cyclic nitrile carbonate-cyclic nitrile sulfite terminated polyether prepolymer.

The addition of terephthalo di(nitrile sulfite) is delayed two hours after the addition of the terephthalo di(nitrile carbonate) because of its greater rate of reaction as pointed out in the text above.

EXAMPLE XLIII

Preparation of cyclic nitrile oxalate-terminated prepolymer from polyoxypropylene diol A mixture of 1 mole of polyoxypropylene diol (Actol 21-56 diol; M.W. approx. 2000), 2 moles of terephthalo-di(nitrile oxalate) prepared as described in Example XXI and 0.5% by weight of triethylamine is placed in a reaction flask and heated to 70° C. A reaction takes place as evidenced by the liberation of carbon dioxide and carbon monoxide from the reaction mixture. After heating for four hours, the resulting mixture is analyzed by infrared analysis which shows urethane groups and cyclic nitrile oxalate groups. The product is identified, therefore, as a cyclic nitrile oxalate-terminated prepolymer having the following structure:

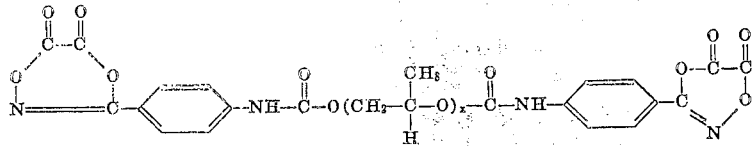

EXAMPLE XLIV

Preparation of p-methoxyphenyl methyl carbamate from p-methoxy benzonitrile carbonate and methanol To 50 ml. of methanol in a 250 ml. Erlenmeyer flask equipped with a condenser and a magnetic stirring bar are added 0.5 ml. of triethylamine and 5.0 g. of p-methoxy benzonitrile carbonate. The resulting mixture is stirred at the reflux temperature of methanol for one hour, cooled and the methanol stripped off under vacuum. The resulting residue is a white crystalline solid. This material is recrystallized from ethyl acetate to give 4.5 g. of p-methoxyphenyl methyl carbamate. Yield 96%. The infrared spectrum (Nujol mull) of the recrystallized material shows a significant absorption band at 3.1 microns characteristic of N—H stretching, a significant band at 5.90 microns characteristic of a urethane

and strong absorption band at 8.01 microns characteristic of

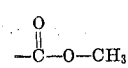

stretching.

EXAMPLE XLV

Preparation of n-butyl phenyl urea from benzonitrile carbonate and n-butylamine

To 50 ml. of tetrahydrofuran in a 250 ml. Erlenmeyer flask equipped with a condenser and a magnetic stirring bar are added 0.5 ml. of triethylamine, 5.0 g. (0.03 mole) of benzonitrile carbonate and 2.2 g. (0.03 mole) of n-butylamine. The resulting mixture is stirred at the reflux temperature of tetrahydrofuran for one hour, cooled and the tetrahydrofuran stripped off under vacuum. The resulting N,N′ n-butyl phenyl urea is recrystallized from water to give white crystals melting at 129° C. Yield 81%.

EXAMPLE XLVI

Preparation of a urea-urethane polymer

To 50 ml. of acetonitrile in a 250 ml. Erlenmeyer flask equipped with a condenser and a magnetic stirring bar is added 10 g. (0.05 mole) of isophthalo di(nitrile carbonate), 3 g. (0.05 mole) of polypropylene glycol (M.W. approx. 150) and 0.5 ml. of triethylamine. The reaction mixture is refluxed for three hours after which an aliquot of the reaction mixture is analyzed by infrared analysis. The infrared analysis shows both urethane groups and unreacted nitrile carbonate groups.

To the reaction mixture while at its reflux temperature is added 3.0 g. (0.052 mole) of menthane diamine. Within five minutes of the addition of the diamine a vigorous reaction sets in and a solid separates out. The reaction mixture is cooled and filtered. The solid material that is recovered is insoluble in a number of organic solvents. The product is analyzed by infrared analysis which shows both urea and urethane absorption bands. It is identified, therefore, as a polymer composed of urea-urethane linkages having the following structure:

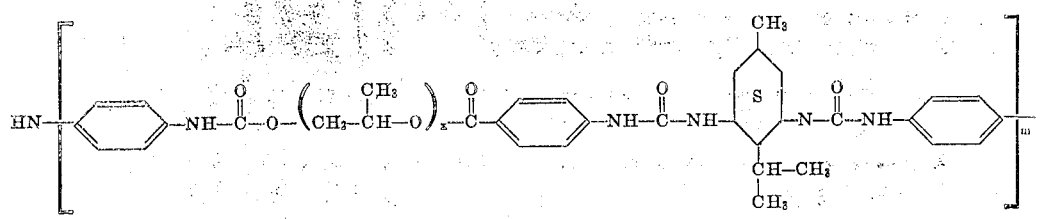

EXAMPLE XLVII

Preparation of cyclic nitrile carbonate-terminated prepolymer from polybutadiene diethyleneimine A mixture of 1 mole of polybutadiene diethyleneimine and 2 moles of terephthalo di(nitrile carbonate) prepared as described in Example XVII and 0.5% by weight of triethylamine is placed in a reaction flask and heated to 70° C. A reaction takes place as evidenced by the liberation of carbon dioxide from the reaction mixture. After heating for three hours the resulting mixture is analyzed by infrared analysis which shows the presence of both urea groups and cyclic nitrile carbonate groups. The product is identified, therefore, as a cyclic nitrile carbonate-terminated prepolymer.

EXAMPLE XLVIII

Preparation of cyclic nitrile sulfite terminated prepolymer from polybutadiene diethyleneimine A mixture of 1 mole of polybutadiene diethyleneimine and 2 moles of adipodi (nitrile sulfite) prepared as described in Example V, and 0.5% by weight of triethylamine are placed in a reaction flask and heated to 50°. A reaction takes place as evidenced by the liberation of sulfur dioxide from the reaction mixture. Heating is continued for three hours and the reaction mixture analyzed by infrared analysis which shows the presence of both urea groups and cyclic nitrile sulfite added groups. Based upon the infrared analysis, therefore, the product is identified as a cyclic nirtile sulfite-terminated prepolymer.

EXAMPLE XLIX

Reaction of a cyclic nitrile carbonate terminated prepolymer with menthane diamine—Formation of a polyurea polymer One molar equivalent of the prepolymer described in Example XLVII is mixed with one molar equivalent of menthane diamine. A slow reaction is noticed at room temperature. Since the original prepolymer contains 0.5% by weight of triethylamine no fresh catalyst is added. The reaction mixture is then heated in a stirred resin kettle to 70° C. and maintained at this temperature for five hours. Evolution of $CO_2$ is noiced during the first three hours which subsides to nearly zero after which time the reaction product is an extremely viscous material. At the end of five hours the reaction product is a tough elastomeric polyurea compound.

EXAMPLE L

Reaction of a cyclic nitrile sulfite-terminated prepolymer with 1,4-butane diamine—Formation of a polyurea polymer One molar equivalent of the prepolymer described in Example XLVIII is mixed with one molar equivalent of 1,4-butane diamine. The reaction is carried out in a stirred resin kettle. Since the original prepolymer contains 0.5% by weight of triethylamine no fresh catalyst is added. The reaction mixture is heated to 70° C. and a reaction is evidenced by the liberation of sulfur dioxide. Within 3 hours the reaction mixture gels to a tough polyurea composition.

EXAMPLE LI

Polymer of adipo di(nitrile carbonate) with polypropylene glycol

Into a 200 ml. four-necked, round bottom flask equipped with stirrer, condenser and thermometer are placed 22.8 g. (0.1 mole) adipo di(nitrile carbonate), 15 g. (0.1 mole) polypropylene glycol (M.W. approx. 150) and 10 ml. of acetonitrile. The mixture is heated slowly to 60° C., then 1 g. of Dabco (triethylene diamine, 33% solids) catalyst is added. After 1 minute, evolution of gas is observed. This gas is bubbled into a freshly prepared $Ba(OH)_2$ solution and gives a white precipitate which is identified as barium carbonate. The reaction temperature is kept between 60° and 70° C. and after 2 hours a light yellow rubbery, sponge-like polymer is obtained.

The I.R. analysis shows the presence of urethane, indicated by a peak at 5.9 which is characteristic of this kind of compound.

EXAMPLE LII

Propyl n-butyl carbamate by reaction of propyl nitrile carbonate with n-butanol

The reaction mixture consisting of 5.7 g. (0.05 mole) propyl nitrile carbonate, 3.7 g. (0.05 mole) n-butanol, 2 ml. of acetonitrile and 5 drops of Dabco (triethylene diamine 33% solids) catalyst is reacted in a 100 ml. round bottom reaction flask, fitted with stirrer and condensor, at 70-80° C. for 3 hours. Carbon dioxide is given off and collected in a standardized barium hydroxide solution. After 3 hours the reaction is complete and the clear reaction mixture fractionated. The fractionation is carried out in vacuum and the low boiling materials are collected in a Dry Ice trap.

The high boiling material is mainly starting material.

The low boiling materials are then fractionated under normal pressure which yields, aside from the solvent used, 1.1 g. (0.015 mole) ethyl isocyanate B.P. 60° C.—30%; 3.3 g. (0.013 mole) urethane (propyl n-butyl carbamate) —26%. Above compounds are identified by I.R. analysis.

EXAMPLES LIII–LX

Illustrative of storage stable compositions of the present invention are:

Examples—
- LIII—1 molar equivalent of polypropylene glycol (M.W. approx. 150) and 1 molar equivalent terephthalo di(nitrile carbonate).
- LIV—1 molar equivalent of polypropylene glycol (M.W. approx. 150) and 1 molar equivalent of cyclic nitrile carbonate adduct-terminated prepolymer of Example XXIX.
- LV—1 molar equivalent of adipo di(nitrile sulfite) and 1 molar equivalent of hydroxyl-terminated polybutadiene (M.W. approx. 2000).
- LVI—1 molar equivalent of cyclic nitrile carbonate adduct-terminated polyester of Example XXXI and 1 molar equivalent of polyoxypropylene triol.
- LVII—1 molar equivalent of the cyclic nitrile sulfite-terminated prepolymer of Example XL and 1 molar equivalent of polypropylene glycol (M.W. approx. 150).
- LVIII—1 molar equivalent of adipo di(nitrile sulfite) and 1 molar equivalent of polyoxypropylene diol (M.W. approx. 2000).
- LIX—1 molar equivalent of cyclic nitrile carbonate-terminated carboalkoxy hydroxamate prepolymer of Example XXVII and 1 molar equivalent of polypropylene glycol (M.W. approx. 150).

It is claimed:

1. A process for the production of an organic compound containing the radical

which comprises reacting an active hydrogen-containing compound, said active hydrogen being as determined by the Zerewitinoff test, with a cyclic nitrile adduct compound having the structure:

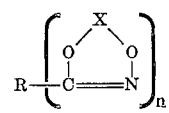

wherein R is a hydrocarbon-containing radical free of nucleophilic groups, X is selected from the group consisting of $$-\overset{O}{\underset{\|}{C}}-, \quad -\overset{O}{\underset{\|}{S}}-, \quad \text{and} \quad -\overset{O}{\underset{\|}{C}}-\overset{O}{\underset{\|}{C}}-$$

and $n$ is 1 to 4, said reacting being conducted at a temperature below the degradation temperature of the desired product but sufficient to effect a condensation-rearrangement reaction between active hydrogen-containing group and cyclic nitrile adduct group by which there is formed the uniting radical $$-\overset{}{\underset{H}{N}}-\overset{O}{\underset{\|}{C}}-$$

wherein N's dangling valence is attached to the residue of the cyclic nitrile adduct compound after removal of a cyclic nitrile adduct group and C's dangling valence is attached to the residue of the active hydrogen-containing compound after removal of an active hydrogen, an elimination product of said reaction being carbon dioxide when X is $$-\overset{O}{\underset{\|}{C}}-$$

sulfur dioxide when X is $$-\overset{O}{\underset{\|}{S}}-$$

and carbon dioxide and carbon monoxide when X is $$-\overset{O}{\underset{\|}{C}}-\overset{O}{\underset{\|}{C}}-$$

2. The process of claim 1 wherein the temperature is about 30 to 170° C.

3. The process of claim 1 wherein the temperature is about 50 to 120° C.

4. The process of claim 1 wherein the reacting is conducted with the reactants in contact with a strong base catalyst.

5. The process of claim 2 wherein the reacting is conducted with the reactants in contact with a catalyst having a pKa value greater than 8.

6. The process of claim 3 wherein the reacting is conducted with the reactants in contact with a tertiary amine catalyst having a pKa value greater than 8.

7. The process of claim 1 wherein X is $$-\overset{O}{\underset{\|}{C}}-$$

8. The process of claim 1 wherein X is $$-\overset{O}{\underset{\|}{S}}-$$

9. The process of claim 1 wherein X is $$-\overset{O}{\underset{\|}{C}}-\overset{O}{\underset{\|}{C}}-$$

10. The process of claim 1 wherein R contains up to about 5,000 carbon atoms.

11. The process of claim 7 wherein R contains up to about 30 carbon atoms.

12. The process of claim 7 wherein R is an aromatic radical of 6 to 12 carbon atoms and the cyclic nitrile adduct groups are in non-ortho positions.

13. The process of claim 1 wherein the active hydrogen-containing compound contains hydrocarbon and is monofunctional, $n$ is at least 2 and R contains up to about 50 carbon atoms to yield as the reaction product a cyclic nitrile adduct group-containing compound having the structure:

$$\left\{\left[\overset{X}{\underset{N=\!=\!C}{\overset{O}{\diagup}\overset{}{\diagdown}\overset{}{C}}}\right]_p - R'-\overset{}{\underset{H}{N}}-\overset{O}{\underset{\|}{C}}-T-\right\}_{x'}Q$$

wherein Q is a hydrocarbon-containing radical, R' is a hydrocarbon-containing radical of up to about 50 carbon atoms, R" is selected from the group consisting of hydrogen and Q, X is selected from the group consisting of $$-\overset{O}{\underset{\|}{C}}-, \quad -\overset{O}{\underset{\|}{S}}-, \quad \text{and} \quad -\overset{O}{\underset{\|}{C}}-\overset{O}{\underset{\|}{C}}-$$

T is selected from the group consisting of oxygen, nitrogen, and sulfur, $n'$ is zero when T is oxygen or sulfur and is one when T is nitrogen, $p$ is 1 to 3, and $x'$ is 1.

14. The process of claim 1 wherein the active hydrogen-containing compound contains hydrogen and is polyfunctional, $n$ is at least 2, R contains up to about 50 carbon atoms, and the proportion employed of the compounds is sufficient to provide a ratio of cyclic nitrile adduct groups to active hydrogen-containing groups of about 1.5 to 10:1 to yield as the reaction product a cyclic nitrile adduct group-containing compound having the structure:

$$\left\{\left[\overset{X}{\underset{N=\!=\!C}{\overset{O}{\diagup}\overset{}{\diagdown}\overset{}{C}}}\right]_p - R'-\overset{}{\underset{H}{N}}-\overset{O}{\underset{\|}{C}}-T-\overset{(R'')_{n'}}{}\right\}_{x'}Q$$

wherein Q is a hydrocarbon-containing radical, R' is a hydrocarbon-containing radical of up to about 50 carbon atoms, R" is selected from the group consisting of hydrogen and Q, X is selected from the group consisting of $$-\overset{O}{\underset{\|}{C}}-, \quad -\overset{O}{\underset{\|}{S}}-, \quad \text{and} \quad -\overset{O}{\underset{\|}{C}}-\overset{O}{\underset{\|}{C}}-$$

T is selected from the group consisting of oxygen, nitrogen and sulfur, $n'$ is zero when T is oxygen or sulfur and is one when T is nitrogen, $p$ is 1 to 3, and $x'$ is the functionality of Q.

15. The process of claim 14 wherein the active hydrogen-containing compound contains a plurality of terminal active hydrogens attached to either oxygen or nitrogen atoms and T is oxygen or nitrogen.

16. The process of claim 15 wherein the active hydrogen-containing compound has a molecular weight up to about 75,000 and the reaction temperature is about 30 to 170° C.

17. The process of claim 1 wherein the active hydrogen-containing compound has a molecular weight up to about 75,000.

18. The process of claim 17 wherein the active hydrogen-containing compound has a plurality of terminal active hydrogens.

19. The process of claim 18 wherein the active hydrogen-containing compound contains active hydrogen attached to oxygen, sulfur, or nitrogen atoms.

20. The process of claim 18 wherein the active hydrogen-containing compound is a hydroxyl group-containing compound.

21. The process of claim 20 wherein the hydroxyl group-containing compound is a glycol.

22. The process of claim 20 wherein the hydroxyl group-containing compound is a polyhydric polyalkylene ether.

23. The process of claim 20 wherein the hydroxyl group-containing compound is a hydroxyl group-terminated olefin polymer.

24. The process of claim 20 wherein the hydroxyl group-containing compound is a hydroxyl group-containing mono- or polyester.

25. The process of claim 1 wherein the active hydrogen-containing compound is a hydroxyl group-containing compound having a plurality of terminal hydroxyl groups and a molecular weight up to about 75,000, R contains up to about 5,000 carbon atoms, $n$ is 2, and said reacting is conducted at a temperature of about 50 to 120° C. and with the reactants in contact with a base catalyst having a pKa value greater than 8.

26. The process of claim 25 wherein X is

27. The process of claim 26 wherein the proportion employed of the compounds is sufficient to provide a ratio of cyclic nitrile adduct groups to hydroxyl groups of about 0.7 to 10:1.

28. The process of claim 26 wherein the proportion employed of the compounds is sufficient to provide a ratio of cyclic nitrile adduct groups to hydroxyl groups of about 0.7 to 1.4:1.

29. The process of claim 27 wherein the hydroxyl group-containing compound is a polyhydric polyalkylene ether.

30. The process of claim 29 wherein the hydroxyl group-containing compound is polypropylene glycol.

31. The process of claim 30 wherein R contains up to about 30 carbon atoms.

32. The process of claim 30 wherein the cyclic nitrile adduct compound has the structure:

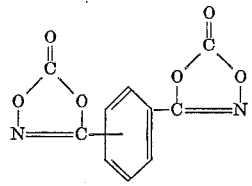

wherein the cyclic nitrile adduct groups are in a non-ortho position.

33. The process of claim 32 wherein the catalyst is a tertiary amine.

34. The process of claim 18 wherein the active hydrogen-containing compound contains active hydrogen attached to a nitrogen atom.

35. The process of claim 18 wherein the active hydrogen-containing compound is a polyamine.

36. The process of claim 18 wherein the active hydrogen-containing compound is a polyimine.

37. The process of claim 1 wherein the active hydrogen-containing compound has a molecular weight up to about 75,000 and a plurality of terminal, active hydrogen-containing groups selected from the group consisting of amine and imine groups, R contains up to about 5,000 carbon atoms, $n$ is 2, and said reacting is conducted at a temperatutre of about 50 to 120° C., and with the reactants in contact with a base catalyst having a pKa value greater than 8.

38. A process for the production of an organic compound containing a plurality of

radicals which comprises reacting an active hydrogen-containing compound, said active hydrogen being as determined by the Zerewitinoff test, with a cyclic nitrile adduct group-containing compound having the structure:

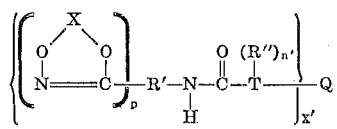

wherein Q is a hydrocarbon-containing radical, R' is a hydrocarbon-containing radical of up to about 50 carbon atoms, R" is selected from the group consisting of hydrogen and Q, X is selected from the group consisting of

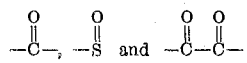

T is selected from the group consisting of oxygen, nitrogen, and sulfur, $n'$ is zero when T is oxygen or sulfur and is one when T is nitrogen, $p$ is 1 to 3, and $x'$ is 1 up to the functionality of Q, said reacting being conducted at a temperature below the degradation temperature of the desired product but sufficient to effect a condensation-rearrangement reaction between active hydrogen-containing group and cyclic nitrile adduct group by which there is formed the uniting radical

wherein N's dangling valence is attached to the residue of the cyclic nitrile adduct group-containing compound after removal of a cyclic nitrile adduct group and C's dangling valence is attached to the residue of the active hydrogen-containing compound after removal of an active hydrogen, an elimination product of said reaction being carbon dioxide when X is

sulfur dioxide when X is

and carbon dioxide and carbon monoxide when X is

39. The process of claim 38 wherein Q contains up to 50 carbon atoms and is difunctional, $x'$ is 2, T is oxygen, said active hydrogen-containing compound has a plurality of terminal active hydrogens, and the proportion employed of the compounds is sufficient to provide a ratio of cyclic nitrile adduct groups in the adduct group-containing compound to active hydrogen-containing groups in the active hydrogen-containing compound of about 0.7 to 1.4:1.

40. The process of claim 39 wherein the active hydrogen-containing compound is polyfunctional and the active hydrogens are attached either to an oxygen or a nitrogen atom.

41. The process of claim 40 wherein the active hydrogen-containing compound has a molecular weight up to about 75,000 and the reaction temperature is about 30 to 170° C.

42. A cyclic nitrile adduct group-containing compound having the structure:

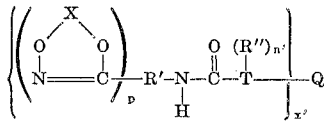

wherein Q is a hydrocarbon-containing radical; R' is a hydrocarbon-containing radical of up to about 50 carbon atoms; R" is selected from the group consisting of hydrogen and Q; X is selected from the group consisting of

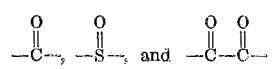

T is selected from the group consisting of oxygen, nitrogen, and sulfur; $n'$ is 0 when T is oxygen or sulfur and is 1 when T is nitrogen; $p$ is an integer of 1 to 3; and $x'$ is an integer of 1 up to the functionality of Q.

43. The compound of claim 42 wherein T is oxygen and Q contains up to 50 carbon atoms.

44. The compound of claim 42 wherein T is nitrogen, R" is hydrogen, and Q contains up to 50 carbon atoms.

45. The compound of claim 42 wherein Q has a molecular weight up to about 75,000 and a functionality of 2 to about 20 and T is oxygen or nitrogen.

46. A storage stable composition comprising a cyclic nitrile adduct group-containing compound selected from the group consisting of (a) the compound of claim 42 and (b) the cyclic nitrile adduct compound having the structure:

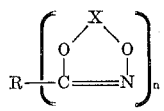

wherein R is a hydrocarbon-containing radical free of nucleophilic groups, X is selected from the group consisting of

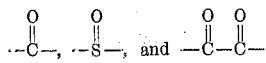

and $n$ is 1 to 4, in admixture with an active hydrogen-containing compound which is non-reactive at ambient temperatures with said cyclic nitrile adduct group-containing compound, said active hydrogen being as determined by the Zerewitinoff test.

47. The composition of claim 46 wherein Q has a molecular weight up to about 75,000 and a functionality of 2 to about 20, R contains up to about 5,000 carbon atoms, and the active hydrogen-containing compound has a molecular weight up to about 75,000.

References Cited

UNITED STATES PATENTS 3,268,542   8/1966   Burk et al. _____ 260—301

OTHER REFERENCES

Chemical Abstracts, vol. 54, p. 260c, 1960.
Chemical Abstracts, vol. 57, p. 5931a, 1962.
Chemical Abstracts, vol. 59, p. 5168c, 1963.

DONALD E. CZAJA, Primary Examiner

R. W. GRIFFIN, Assistant Examiner

U.S. Cl. X.R.

71—3; 106—15; 117—161, 167; 167—30; 260—2.5, 31.2, 31.4, 33.4, 37, 40, 75, 77.5, 78.4, 78.5, 240, 244, 301, 307, 453, 471, 482, 553, 859

UNITED STATES PATENT OFFICE
CERTIFICATE OF CORRECTION

Patent No. 3,531,425                    Dated September 29, 1970

Inventor(s) Emmett H. Burk, Jr., Larry G. Wolgemuth, and Helmuth W. Kutta

It is certified that error appears in the above-identified patent and that said Letters Patent are hereby corrected as shown below:

Column 6, lines 45 and 66, "C-N" should read --C=N--.
Column 10, line 31, "produce" should read --product--.
Column 12, line 16, "moonfunctional" should read --monofunctional--.
Column 14, line 23, "hether" should read --whether--.
Column 15, line 59, "adpic" should read --adipic--.
Column 15, line 67, "thonic" should read --thionic--.
Column 17, line 32, "regents" should read --reagents--.
Column 18, line 43, "Like" should read --Likewise--.
Column 18, that portion of the structural formula at lines 66-71 reading

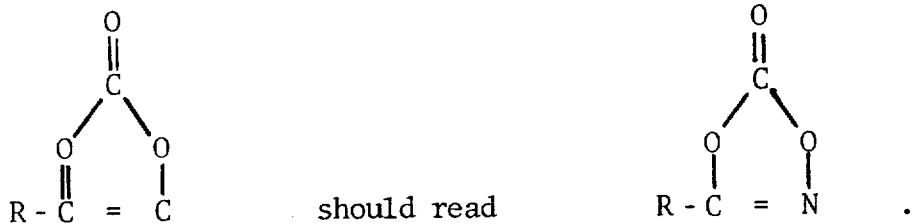

Column 19, that portion of the structural formula at lines 2-5 reading

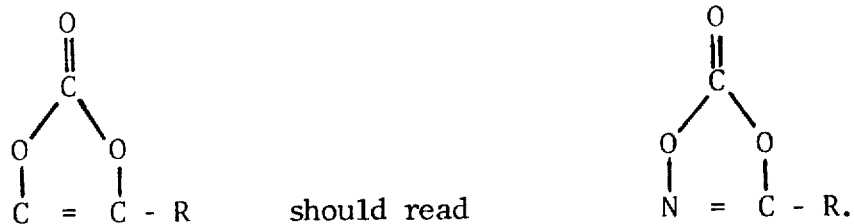

Column 21, line 30, "2-X-" should read --2-OX- --.
Column 25, line 48, "38 C." should read --38°C."--
Column 26, line 18, "0.04 mole)" should read --(0.04 mole)--.

UNITED STATES PATENT OFFICE
CERTIFICATE OF CORRECTION Page 2

Patent No. 3,531,425  Dated September 29, 1970

Inventor(s) Emmett H. Burk, Jr., Larry G. Wolgemuth, and Helmuth W. Kutta

It is certified that error appears in the above-identified patent and that said Letters Patent are hereby corrected as shown below:

Column 27, line 10, "(diazabicyclooctane)" should read
--(Diazabicyclooctane)--.
Column 27, that portion of the structural formula at lines 60-65 reading

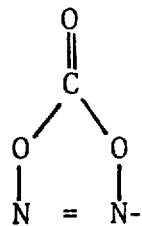   should read   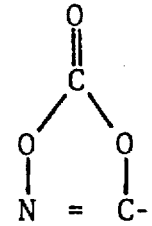

Signed and sealed this 12th day of October, 1971.

(SEAL)
Attest:

EDWARD M. FLETCHER, JR.
Attesting Officer

ROBERT GOTTSCHALK
Acting Commissioner of Patents